(12) United States Patent
Roy et al.

(10) Patent No.: US 11,218,422 B2
(45) Date of Patent: Jan. 4, 2022

(54) SYSTEM AND METHOD OF TRAFFIC-BASED CLASSIFICATION OF IOT DEVICES AND DYNAMIC ALLOCATION OF LINK RESOURCES TO IOT DEVICES

(71) Applicant: Hughes Network Systems, LLC, Germantown, MD (US)

(72) Inventors: Satyajit Roy, Gaithersburg, MD (US); John D Kenyon, Gaithersburg, MD (US); Amit Arora, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 78 days.

(21) Appl. No.: 16/729,348

(22) Filed: Dec. 28, 2019

(65) Prior Publication Data

US 2021/0203615 A1 Jul. 1, 2021

(51) Int. Cl.
*H04L 12/927* (2013.01)
*H04L 12/24* (2006.01)
(Continued)

(52) U.S. Cl.
CPC .......... *H04L 47/805* (2013.01); *H04L 41/16* (2013.01); *H04L 47/2425* (2013.01);
(Continued)

(58) Field of Classification Search
CPC ... H04L 47/805; H04L 41/16; H04L 47/2425; H04L 47/2441; H04L 47/6255; H04L 67/12
See application file for complete search history.

(56) References Cited

U.S. PATENT DOCUMENTS 10,440,577 B1 10/2019 Vasseur et al.
10,904,086 B1 * 1/2021 Varia ................. G06F 9/4401
(Continued)

FOREIGN PATENT DOCUMENTS

EP 2600538 A2 6/2013
WO 2008100341 A2 8/2008

OTHER PUBLICATIONS

Bonawitz et al., "Towards Federated Learning at Scale: System Design," Proceedings of the 2nd SysML Conference, 2019, arXiv:1902.01046v2 [cs.LG] Mar. 22, 2019.
(Continued)

*Primary Examiner* — Chandrahas B Patel
(74) *Attorney, Agent, or Firm* — NovoTechIP International PLLC

(57) ABSTRACT

Systems and method are disclosed and among these is a method for fingerprint based detection of Internet of Things (IoT) devices and classification of IoT device type, and corresponding adaptive allocation of link resources, with monitoring of traffic for flow data, detecting IoT devices and classifying the IoT device types, via machine learning classifiers, real time assigning IoT device type based quality of service (QoS) for IoT device traffic, and corresponding IoT device type based, real time allocating of resources to the link. Optionally, machine classifiers can be centrally instantiated, distributed to what can be large populations of user IoT Internet access terminals, and retrained by same, centrally merged or combined, and then redistributed.

18 Claims, 12 Drawing Sheets

(51) Int. Cl.
*H04L 12/851* (2013.01)
*H04L 12/863* (2013.01)
*H04L 29/08* (2006.01)

(52) U.S. Cl.
CPC ...... *H04L 47/2441* (2013.01); *H04L 47/6255* (2013.01); *H04L 67/12* (2013.01)

(56) References Cited

U.S. PATENT DOCUMENTS

| | | | |
|---|---|---|---|
| 10,949,811 B2 * | 3/2021 | Lu | A61B 5/024 |
| 10,983,894 B2 * | 4/2021 | Tayeb | G06F 11/3495 |
| 2012/0213210 A1 | 8/2012 | Thomasson et al. | |
| 2016/0072574 A1 | 3/2016 | Xu et al. | |
| 2020/0107217 A1 * | 4/2020 | Kumar | H04W 28/0268 |
| 2021/0034619 A1 * | 2/2021 | Foerster | G06F 16/2282 |
| 2021/0067411 A1 * | 3/2021 | Grant | H04L 41/0816 |
| 2021/0092609 A1 * | 3/2021 | Wang | H04W 12/122 |

OTHER PUBLICATIONS

International Search Report and Written Opinion dated Apr. 6, 2021 in corresponding PCT Application No. PCT/US2020/067113 (10 pages).

* cited by examiner

SYSTEM AND METHOD OF TRAFFIC-BASED CLASSIFICATION OF IOT DEVICES AND DYNAMIC ALLOCATION OF LINK RESOURCES TO IOT DEVICES

BACKGROUND

The "Internet of Things" (commonly abbreviated as "IoT") is used to reference an interconnection, via the Internet, of data generating and/or controllable devices—collectively referred to as "things." Example IoT devices include "smart home" devices such as home appliances, e.g. refrigerators, heaters, and air conditioners, with remotely controllable—via the Internet—ON/OFF states and adjustments, and with status and condition sensors that can send alarms and reports, via Internet, to owners and monitoring services. Other example IoT devices include human health monitors, home access control devices, e.g., remotely actuated door and window locks, and surveillance devices, such as motion sensors, intrusion alarms, video cameras, and baby monitors.

Different types of IoT devices can have different data communication requirements. For example, some types of IoT devices can communicate a low amount of data, with a sporadic timing. Other types of IoT devices may communicate large amount of uplink, downlink, or bi-directional data during certain time intervals. If the IoT device type is known, the different communication requirements can be met, by assigning to the IoT device's traffic a channel having a Quality of Service (QoS) that guarantees meeting the requirements of that IoT device type.

However, conventional techniques for determining the IoT device type can have technical shortcomings, e.g., insufficient real-time accuracy in classification, that can render them unsuitable for selecting a QoS, or otherwise assigning channels or other resources.

Satellite communication systems can face particular factors, which can present technical challenges in assigning traffic the appropriate QoS. Example factors include scarcity of bandwidth, latency and potential packet loss. Also, in the context of assigning satellite link resources, incorrect assignments for IoT devices can have substantial costs additional to performance impact on the IoT device. More specifically, satellite link bandwidth can be expensive. Therefore, assigning a bandwidth to an IoT device that, for example, due to mis-identification of the device type, is greater than necessary can be costly.

Traffic from some IoT devices, such as health monitor devices or security systems, can be considered mission critical. Some of the smart IoT devices are always-on in nature, having sensors that capture users' offline activities and transmit information about activities, often to cloud services run by the device manufacturer.

Accordingly, what is needed is systems and methods for machine learning based classification of IoT device types, based on traffic fingerprint and without requiring deep packet inspection or decryption, the classification being accurate and real-time, for dynamic assignment of IoT device type-specific QoS and corresponding allocation of link resources.

SUMMARY

This Summary identifies examples of disclosed features and aspects. It is not an exclusive or exhaustive description of the disclosed subject matter. Additional features and aspects are described, and others will become apparent to persons skilled in the art upon reading the following detailed description and appended drawings that form a part thereof. Whether features or aspects are included in or omitted from this Summary is not intended as indicative of relative importance of such features.

Among examples of disclosed systems are implementations that can provide, among other features and aspects, fingerprint based detection and classification of Intent of Things (IoT) device types, adaptive allocation and access priority to link bandwidth, and various examples of such implementations can include a processor; and a memory, coupled to the processor, storing executable instructions that, when executed by the processor, can cause the processor to monitor a link traffic and generate a corresponding feature data, classify the device, based at least in part on applying a machine learning classifier to at least a portion of the feature data, between being and not being an IoT device of a particular IoT device type, and can cause the processor, in response to classifying the device as the IoT device of the particular IoT device type, to assign an IoT device type-specific QoS for carrying a traffic associated with the IoT device, and allocate, for traffic associated with the IoT device, resources of the link in accordance with the assigned IoT device type-specific QoS.

Among examples of disclosed systems are further implementations that can also include executable instructions that, when executed by the processor, can cause the processor to receive a baseline classifier model, store the baseline classifier model in a memory, and apply the stored baseline classifier model as the machine learning classifier. Examples of such implementations can also include, in the memory, executable instructions that, when executed by the processor, can cause the processor to generate a retrained baseline classifier model, based at least in part on applying a retraining to the stored baseline classifier; upload the retrained baseline classifier model to a server; and, subsequent to the upload, to receive an updated baseline classifier model, and set the stored baseline classifier model according to the received updated baseline classifier model.

Among examples of disclosed methods are implementations that can provide, among other features, fingerprint based detection of IoT devices, classification of IoT device type, and corresponding allocation of link resources, and various examples of such methods can include monitoring, in association with a link, a traffic of a device and generating a corresponding feature data; classifying the device, based at least in part on applying a machine learning classifier to at least a portion of the feature data, between being and not being an IoT device of a particular IoT device type; and in response to classifying the device as the IoT device of the particular IoT device type, assigning an IoT device type-specific QoS for carrying a traffic associated with the IoT device, and allocating, for traffic associated with the IoT device, resources of the link in accordance with the assigned IoT device type-specific QoS.

Among examples of disclosed methods are further implementations that can also include receiving a baseline classifier model, storing the baseline classifier model in a memory, and applying the stored baseline classifier model as the machine learning classifier. Various examples of such implementations can also include generating a retrained baseline classifier model, based at least in part on applying a retraining to the stored baseline classifier; uploading the retrained baseline classifier model to a server; and, subsequent to the upload, receiving an updated baseline classifier model, and setting the stored baseline classifier model according to the received updated baseline classifier model.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
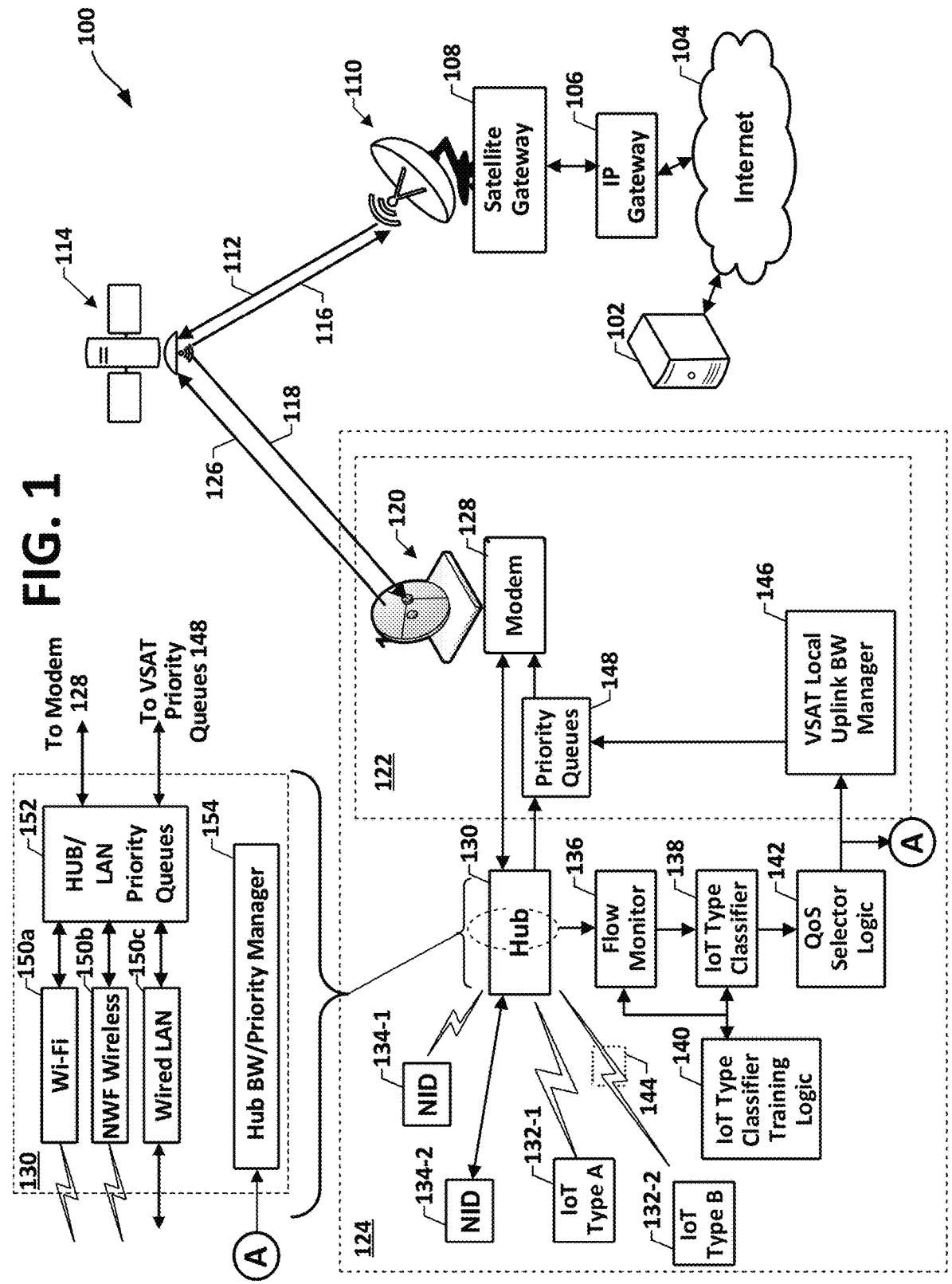
FIG. 1 is a block schematic of one example system for fingerprint based detection and classification IoT device type, and IoT type-based adaptive allocation and access priority to VSAT bandwidth.

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

Disclosed systems and methods according to this disclosure can provide traffic fingerprint based VSAT classifying of IoT device types, assigning IoT device type-specific QoS, and corresponding allocating of link resources and priority of access to link resources. Features of disclosed systems and methods can include, but are not limited to, real-time, accurate classification of IoT device type without deep packet inspection and regardless of encryption. In an aspect, the machine learning classifier can be implemented as a two-part or two-stage machine learning classifier that, based on device traffic, can first classify between an IoT device and a non-IoT device and then, if classified as an IoT devices, can classify the IoT device according to IoT device type. Secondary benefits of such features can include, for example, identification among different streaming devices, which can enable support of resolution conversion that is appropriate to the streaming device type—in addition to classifying IoT device types and corresponding allocating of link resources to IoT devices, Systems and methods according to the present disclosure can also provide server resource distribution of a centralized classifier model to a population of VSATs, e.g., hundreds of thousands of VSATs, for the VSATs to use in classifying IoT device types, assigning IoT device type-specific QoS, and allocating QoS appropriate link resources. Such systems and methods can also provide VSAT individual retraining of their respective copies of the centralized classifier model, uploading of their individual retraining results to the server resource, in addition to the server resource combining the uploaded individual retraining results into a new centralized classifier model. Features can also include the server resource conditioning distribution of the new centralized classifier model on passing one or more qualification tests. For purposes of description, disclosed machine learning classifiers associated with distribution of a centralized classifier model, VSAT individual retraining and uploading retraining results to the server, and server generation of a new centralized classifier based on the uploads, can be referred to as "federated learning classifier." Training aspects of the federated learning classifier can be referred to as "federated machine learning training" or "federated ML training." It will be understood that the phases "federated learning classifier," "federated machine learning training," "federated ML training," and variations thereof, are arbitrary names used herein solely for convenience of description and carry no intrinsic meaning.

FIG. 1 is a block schematic of one system for machine learning, traffic fingerprint based IoT device detection and type classification, and device type-based allocation and prioritization of access to VSAT inroute bandwidth (hereinafter "system 100"). The system 100 can include an IoT server 102 that can connect through the Internet 104 and Internet interfacing P gateway (GW) 106 to a satellite GW 108. The satellite GW 108 can include a radio frequency (RF) transmitter/receiver (TX/RX) 110 that can transmit an uplink 112 to a satellite resource 114 and receive from the satellite 114 a downlink 116. The satellite resource 114 can repeat or re-transmit traffic received from the uplink 112, over downlink 118 to an antenna (visible, but not separately numbered) coupled to VSAT RF transmitter/receiver (TX/RX) 120 of a VSAT terminal 122. The VSAT terminal 122 can be associated, for example, with a premises 124 such as, without limitation, a customer home equipped and configured as a "smart home." For purposes of description, the uplink 112 and downlink 118 will also be referenced, respectively, as "forward uplink 112" and "forward downlink 118." The VSAT terminal RF TX/RX 120 can be configured to transmit a VSAT-to-satellite resource uplink 126 to the satellite resource 114 and receive the above-described forward downlink 118 from the satellite resource 114. For purposes of description the VSAT-to-satellite resource uplink 126 will also be referred to as "reverse uplink" 126.

The VSAT terminal 122 can include a satellite modem 128 that can connect at one side to the VSAT terminal TX/RX 120 and, at the other side, to a hub 130. On the premises 124 and connected to the hub 130 by short range wireless or wired connection can be one or more IoT devices, such as the example first IoT device 132-1 and second IoT device 132-2 (collectively "IoT devices 132"). Example type of IoT devices 132 can include, but are not limited to, cameras, light bulbs, health and well-being monitors, security devices, home appliance monitors, printer and consumer electronics. There can also be one or more non-IoT devices, such as the example first non-IoT device 134-1 and second non-IoT device 134-2 (collectively "non-IoT devices 134," and labeled "NID" on FIG. 1).

The VSAT terminal 122 can include a flow monitor 136, an IoT device type classifier model 138, and an IoT device type classifier machine learning (ML) training logic 140. The flow monitor 136 can be configured to detect traffic traces, e.g., by monitoring a network tap in the hub 130. The IoT device type classifier ML training logic 140 can be configured to analyze and characterize statistical attributes from the traffic traces. Examples of statistical attributes that can be characterized can include, but are not limited to, data rates and burstiness, activity cycles, and signaling patterns. A device behavior can be approximated using features extracted from the network traffic of the device. This can be used to generate training data. The IoT device type classifier ML training logic 140 can be configured to train the IoT device type classifier model 138 a machine learning model that can be used to detect similar device types. This approach is successful even when a device uses encrypted communication.

Using these attributes, techniques can be developed which not only distinguishes IoT from non-IoT traffic, but also identify specific IoT devices with a great degree of accuracy. The VSAT terminal 122 can also include an IoT device type-based QoS selection logic 142. It will be understood that "QoS," as used in this description, includes but is not limited to latency, bandwidth, or packet loss, and any combination or sub-combination thereof.

Regarding wireless connection between IoT devices 132 and the hub 130, example implementations can include Wi-Fi, or another wireless protocol, or various combinations or sub-combinations thereof. For example, certain IoT devices 132 use low range and low power wireless interfaces other than Wi-Fi, such as ZigBee, LoRaWAN, and/or BLE (Bluetooth Low Energy). FIG. 1 shows by enlarged view an example implementation of the hub 130 that can provide the above-identified wireless interface, as well as a wired LAN interface, in addition to hub 130 resource allocation and access priority features that will be described in greater detail in later paragraphs.

The satellite GW 108 can include a channel manager logic (not separately visible in FIG. 1) that can be configured to establish and tear down channels (not separately visible in FIG. 1) from the satellite GW 108 to the VSAT terminal 122. Such channels can be alternatively referred to as "outroutes." The system 100 can include an "outroute manager" logic (not separately visible in FIG. 1) for managing such outroutes. The outroute manager can be implemented, for example, as a resource of the satellite GW 108. The outroutes can be carried, for example, by assignable time-frequency slots of the forward uplink 112, in series with time-frequency slots of the forward downlink 118 to VSAT terminal 122, or time-frequency slots of other forward downlinks (not visible in FIG. 1) from the satellite resource 114 to other VSATs (not visible in FIG. 1) within satellite resource 114 spot beam coverage area. The time-frequency slots of the forward uplink 112 and forward downlink 118 can be per-channel assignable. This can enable time division multiple access (TDMA) multiple outroute sharing of sub-bands.

Implementations of the VSAT 122 can include logic, described in greater detail later, for sending requests to an inroute manager (not separately visible in FIG. 1) in or associated with the satellite GW 108, for additional BW for the reverse uplink 126.

The VSAT terminal 122 can include VSAT uplink BW manager logic 146 for allocating to the IoT devices 132 and non-IoT devices 134 respective sub-bands or time slots of sub-bands of the reverse uplink 126. The VSAT uplink BW manager logic 146 can also be configured to allocate to different IoT devices 132 and different non-IoT devices 134 respectively different priority of access to such uplink sub-bands or time slots. Different priority of access to uplink sub-bands or time slots can be allocated, for example, based at least in part on respective maximum delay guarantees provided to the different IoT devices 132 and non-IoT devices 134. Implementation of such access priority can include, for example, priority queues 148 that can be managed, for example, by the VSAT uplink manager 146. The priority queues 148 can include a plurality of different queues (not separately visible in FIG. 1), each associated with a corresponding packet delay maximum range. Accordingly, the VSAT uplink manager 146 can include a logic, e.g., a mapping table (not explicitly visible in FIG. 1), configured to convert or map QoS specifications that include packet delay to a particular one of the priority queues 148. Such mapping is not necessarily fixed and, in an aspect, can depend at least in part on relative fill levels of the different priority queues 148. In implementations of fill-level dependent queuing, the priority queues 148 can include or couple to a queue fill level detection logic (not visible in FIG. 1).

In an example application, the IoT device type classifier 138 may detect and classify an IoT traffic as corresponding to an IoT device 132 of a first device type, and another IoT traffic as corresponding to an IoT device 132 of a second device type. The QoS selection logic 142 can in response output, respectively, a first QoS specification that can include a guaranteed first maximum delay and a second QoS specification that can include a guaranteed second maximum delay. There may be instances in which the guaranteed first maximum delay can be met by queuing the traffic in a first priority queue (not separately visible in FIG. 1) among the priority queues 148, while the guaranteed second maximum delay can be met using, instead, a second priority queue (not separately visible in FIG. 1). Accordingly, the VSAT uplink manager 146 can be configured to respond by selecting, respectively, the first and the second priority queue among the priority queues 148. For such applications, the VSAT uplink manager 146 can be further configured to dequeue from the first priority queue packets of the first IoT device type, according to a first priority dequeuing, and dequeue from the second priority queue packets of the second IoT device type, according to a second priority dequeuing, in which the first priority dequeuing may take precedence over the second priority dequeuing.

The example implementation of the hub 130 shown by enlarged view on FIG. 1 can include, as an implementation of the above-described wireless interface to IoT devices 132 and non-IoT devices 134, a Wi-Fi interface 150a, and a non-Wi-Fi (labeled "NWF" in FIG. 1) interface 150b. For various applications, the hub 130 can also include a wired LAN interface 150c. For purposes of description the Wi-Fi interface 150a, non-Wi-Fi interface 150b, and wired LAN interface 150c will also be referred to, collectively, as "user device interface 150." Based at least in part on interface requirements of particular application-specific IoT devices 132 and of non-IoT devices 134, if any, implementations of the user device interface 150 may omit, for example, the wired LAN interface 150c.

The FIG. 1 example implementation of the hub 130 can include hub/LAN priority queues 152, and a hub BW/priority manager 154 that can be communicatively coupled to the user device interface 150 and to the hub/LAN priority queues 152. In an implementation, as is visible in FIG. 1 by connection points "A," hub BW/priority manager 154 can be configured to receive the output of the QoS selection logic 142 and further configured to selectively control, based at least in part on that QoS output, the user device interface 150, or the hub/LAN priority queues 152, or both. The configuration can include, for example, a mapping of QoS to hub resources, e.g., QoS latency specification to queuing selection and control parameters for the hub/LAN priority queues 152. Technical features of this QoS-based, i.e., IoT device type-based, allocation of and priority of access to hub 130 resources can include alternative, or additional capability of the system 100 to meet, or more efficiently meet, or both, the different communication requirements of different IoT device types 132 and different non-IoT devices 134, if any.

It will be understood that blocks 128, 130, and blocks 150-154 of the example implementation of the hub 130, represent functions. Said blocks do not define, limit, or indicate a preference as to the implementation's architecture. As one example, the modem 128 may be included in an apparatus (not separately visible in FIG. 1) that can also include native wireless interfaces to the IoT devices 132 and non-IoT devices 134.

It will also be understood that the VSAT terminal 122 priority queues 148 and the hub/LAN priority queues 152 are logic blocks. Implementation is not limited to hardware techniques specific to queues. For example, and without limitation, implementations of the VSAT terminal 122 priority queues 148, or the hub/LAN priority queues 152, or both, can include a virtual memory space supported or hosted by an addressable random access memory RAM or RAM resource, combined with a queuing management configured RAM read-write addressing logic.

Various implementations of the VSAT terminal 122 can include logic (not explicitly visible in FIG. 1) configured to request additional uplink bandwidth from the inroute manager. The requests can be based at least in part, for example, on detecting certain types of IoT devices 132, in combination with detecting a present fill or back-up condition of the priority queues 148. Examples of such implementations are described in greater detail later, e.g., in reference to FIGS. 5 and 6.

The FIG. 1 representation of the IoT type classifier 138 appears as a single block. The single block, though, is for simplicity of graphics; it can represent a collection, group, or array of IoT device type classification resources. It is not intended to limit the IoT type classifier 138 to include only one classifier model. For example, the IoT type classifier 138 can be implemented as a two-step or two part classifier model (not separately visible in FIG. 1) that can include a first classifier model (not separately visible in FIG. 1) and a second classifier model (not separately visible in FIG. 1). The first classifier model can be implemented, for example, as a IoT device/non-IoT device binary classifier model. The second classifier model can be implemented, for example, as an R-class IoT device type classifier model, R being an arbitrary integer. The R-class IoT device type classifier model can be applied, for example, to feature data classified by the first classifier model as traffic associated with an IoT device. Example features and benefits of the IoT type classifier 138 being a two-step or two-part classifier can include, but are not limited to, enablement of early distinguishing of non-IoT devices, e.g., NIDs 134, from IoT devices 132. The first classifier model can be configured, or logic can be coupled to the first classifier model to identify information indicative of type and size of non-IoT streaming devices. Still further features can include, without limitation, provision of information that can be analyzed to determine, or assist in determining respective minimum resolutions appropriate for various streaming devices.

In example operations of system 100 in which the IoT type classifier 138 is implemented as a two-step or two part classifier, including the first classifier model and second classifier model, classifying the device between being and not being an IoT device of a particular device type can include classifying, by the first classifier model, the device between an IoT device and being a non-IoT device and, in response to the first classifier model classifying the device as being an IoT device, applying to the second classifier model an input that is based at least in part on the feature data of the IoT device. In such two-part implementation of the IoT type classifier 138, the second classifier model can be further configured to classify the IoT device into one among a plurality of classes, in which the plurality of classes can include an IoT first device type class, an IoT second device type class, and an IoT device null class that includes neither the IoT first device type nor the IoT second device type. Associated with this example two-part implementation of the IoT type classifier 138, the IoT device type-based QoS selection logic 142 can be configured such that, in response to the second classifier model classifying the IoT device as the IoT first device class, the logic 142 can assign a first QoS for carrying a traffic associated with the IoT device and, in response to the second classifier model classifying the IoT device as the IoT second device class, the logic 142 can assign a second QoS for carrying traffic associated with the IoT device.

FIG. 1 shows the example VSAT terminal 122 having just one satellite modem 128. This is not a limitation on practices in accordance with this disclosure. On the contrary, implementations of the satellite modem 128 can include a plurality of modems providing, for example, respectively different bandwidths. In an example, the satellite modem 128 can include a first satellite modem (not explicitly visible in FIG. 1) providing for a narrow band inroute or link, e.g., L or S band, and can include a second satellite modem (not explicitly visible in FIG. 1) that can provide a broadband inroute or link. In an implementation, the VSAT uplink BW manager 146 can be configured to provide, based for example on the QoS output from the QoS selection logic 142, selection between the first and second satellite modem. In an implementation, the BW manager 146 can be configured to select between the first and second modem to provide the reverse uplink 126 as a hybrid link with resources that are allocated as appropriate for an IoT device type. For example, in accordance with one configuration for the BW manager 146, for short and sporadic messages that are critical the narrowband L or S-band links can be selected, e.g., together with the first satellite modem, as the narrowband L or S-band links can provide very reliable delivery. The BW manager 146 can be likewise configured to send high volume background traffic, in contrast, through the broadband/wideband links, e.g., via the second satellite modem.

In another implementation a system can feature both geostationary earth orbiting (GEO) satellite service and low-earth orbiting (LEO) satellite service, with IoT device type based selection and assignment of selecting between can select for IoT device traffic having a low latency requirements and between a LEO and GEO satellite link.

The system 100, and various other systems disclosed herein can provide, among other features, real-time, IoT device-type adaptive assignment of QoS to IoT device traffic, through features that can include monitoring of a VSAT local network traffic, extracting fingerprint features from the monitoring, applying the extracted fingerprint features to a particularly trained ML classifier detection of a new flow, generating or outputting at 218 for classifying the feature data, based at least in part on a machine learning classifier, between indicating and not indicating network traffic flow associated with a particular IoT device. Generating, e.g., at 222, based at least in part on a result of classifying the feature data, a classification result and based at least in part on the classification result indicating network traffic flow associated with the particular IoT device type, assigning a corresponding QoS specification for bearing the network traffic flow associated with the particular IoT device type.

Figure 2:
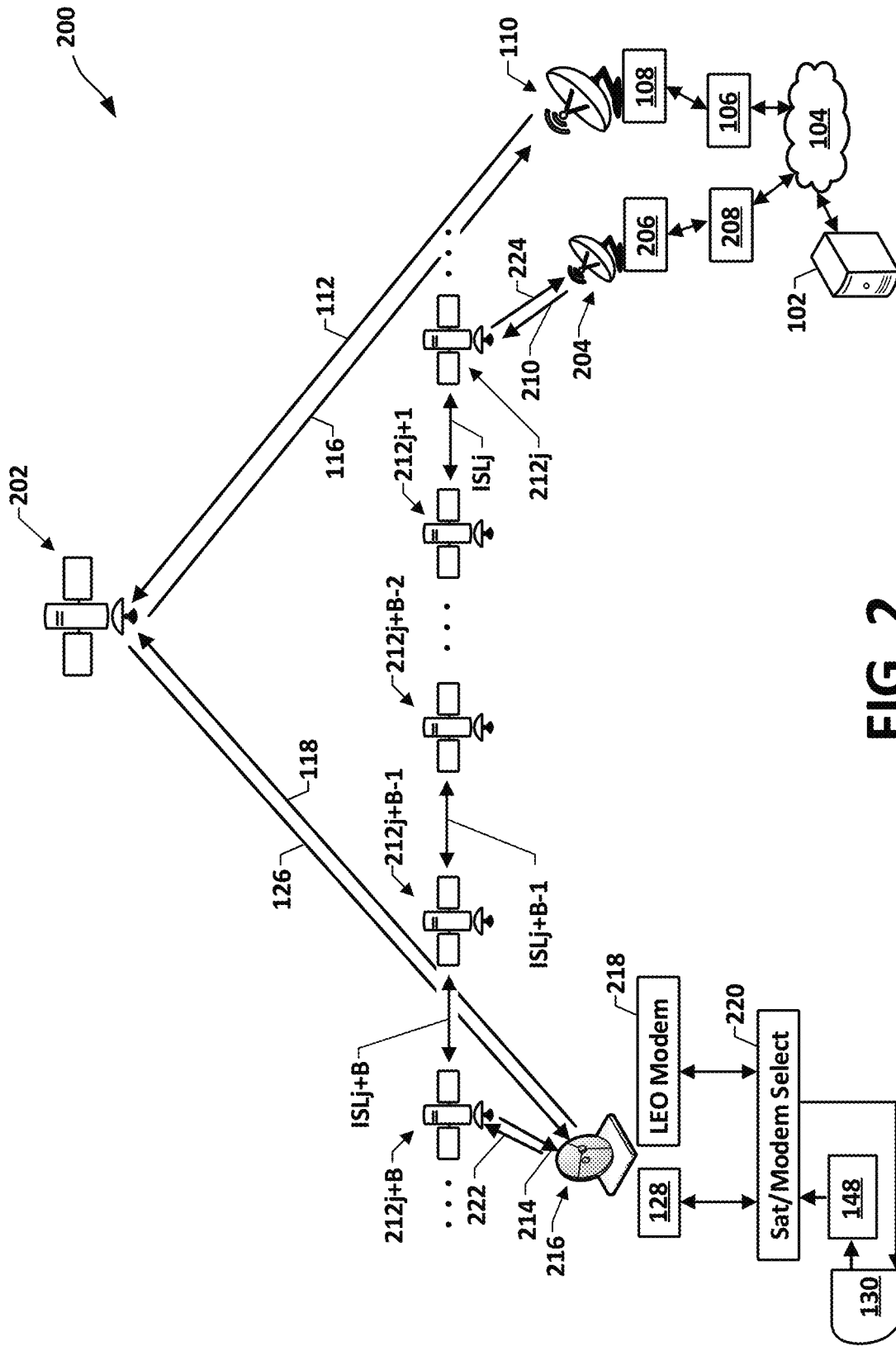
FIG. 2 is a block schematic of one example system for fingerprint based detection and classification of IoT device type, and corresponding real time adaptive allocation and access priority to VSAT bandwidth, with IoT device based real-time selection between low-earth orbiting (LEO) satellite link and geostationary earth orbiting (GEO) satellite link.

FIG. 2 is a block schematic of one example system 200 for IoT device detection, classification, and corresponding real-time allocation and prioritization to VSAT bandwidth, providing a hybrid GEO-LEO multi-layer link between the VSAT terminal 122 and IoT server 102, instead of the single layer satellite link that is visible in system 100. The hybrid GEO-LEO multi-layer link can be implemented by supplementing the satellite BW 108 with a LEO satellite GW 204, which can be connected to the Internet 104 via, for example, LEO IP GW 206, and can be configured to connect by forward uplink 208 and reverse downlink 210, to a LEO satellite, labeled 212$j$, that serves as a LEO ground station edge node, for the duration that it is within the horizon of the LEO satellite GW 204. The LEO ground station edge node 212$j$ can be a successively changing LEO satellite among an orbiting constellation of LEO satellites.

The VSAT terminal 122 can include, in addition to the satellite modem 128 described above, a LEO satellite modem 214 and a modem selector 216. The modem selector 216 can be configured to select, for the hub 130, among the satellite modem 128 and the LEO satellite modem 214. The modem selector 216 can perform the selection based at least in part on QoS (if any) selected by the above-described QoS selection logic 142.

The LEO satellite modem 214 can connect by forward downlink 218 and reverse uplink 220 to LEO satellite 212$j$+B, the VSAT terminal LEO edge node, which can be another among the orbiting constellation of LEO satellites. Each LEO satellite can be configured to construct, and when necessary tear down, a pair of intersatellite links, such as the examples labeled ISLj, . . . , ISLj+B−1, ISLj+B. The value B is an integer that can be determined, for example, by the spacing between the LEO satellites and the geographical distance between the LEO satellite GW 204. An outroute from the LEO satellite GW 204 to the VSAT terminal 122 can therefore be provided by the forward uplink 208 to the LEO GW edge node 212$j$, followed by integer B hops through intersatellite links ISLj, . . . , ISLj+B−1, ISLj+B. to the VSAT terminal LEO edge node 212$j$+B, and then the forward downlink 218. In like manner an inroute can be provided from the VSAT terminal 122 to the LEO satellite GW 204, via reverse uplink 220 to the VSAT LEO edge node 212$j$+B, followed by a reverse direction traversal of the integer B ISL hops to the LEO GW edge node 212$j$, and then the reverse downlink 218.

Notwithstanding there being integer B hops in the above described forward and reverse LEO paths between the VSAT terminal 122 and the LEO satellite GW 204, a time delay incurred in carrying IoT device 132 packets over such forward/reverse LEO paths can be significantly less than the time delay incurred in transmission using the GEO satellite 202. Implementations of the system 200 can therefore be configured such that in response to a QoS from the QoS selection logic 142 specifying a guaranteed maximum delay less than a particular threshold, the modem selector 216 can connect the hub 130 to the LEO satellite modem 214.

In one example application of the system 200, the classifier 138 may detect and classify an IoT traffic as corresponding to an IoT device 132 of a first device type, and another IoT traffic as corresponding to an IoT device 132 of a second device type. In instances, the QoS selection logic 142 may output, respectively a first QoS specification includes a guaranteed first maximum delay and a second QoS specification includes a guaranteed second maximum delay. The may be instances in which the guaranteed first maximum delay is within a threshold that can be met by the GEO satellite 202, while the guaranteed second maximum delay is less than that threshold, i.e., cannot be met by the GEO satellite 202. The system 200 modem selector 216, accordingly, can connect the hub 130 to the LEO satellite modem 128 for carrying the IoT first device type traffic, and to the LEO satellite modem 214 for carrying the IoT second device type traffic.

The system 200 can therefore provide real-time selection of a shorter system delay in response to detecting and classifying, by their respective traffic fingerprints, medical or health monitor IoT devices 132. System 200 can provide further benefit, by providing high reliability, low latency LEO delivery to the IoT server 102, of alarms or reports from medical or health monitor IoT devices 132. Implementations of the system 200, as well as the system 100, can be further configured to generally apply a more robust modulation and coding (MODCOD) for traffic from medical or health monitor IoT devices 132, as such traffic can be low volume, and can benefit from for immediate delivery, for example, via SCMA channel, without need for requesting inroute bandwidth.

There can be some types of IoT devices from which traffic can be considered critical but, at least in some applications, not as critical as life-threatening traffic from health monitor devices. An example of such IoT devices can be any among a variety of IoT security devices. Criticality of such traffic, e.g., in terms of acceptable delay and reliability, may be classified, for example, proximal to the criticality for health monitor related traffic.

Traffic characteristics from cameras can be high volume in nature and do not generally require low latency treatment. This traffic can be sent as a background priority as a best effort traffic.

Referring to the priority queues 148, IoT devices 132 of device types whose traffic does not require immediate delivery can be queued for some time at the satellite modem and then sent, using the stream inroute bandwidth, when sufficiently large number of packets are queued. Features and benefits can include, without limitation, efficient usage of satellite resource usage. Further, this can reduce or eliminate necessity of using Aloha channel or SCMA channel which are costlier schemes of sending inbound traffic that, absent the described features of system 200, can be required when sporadic IoT packets require immediate sending.

Figure 3:
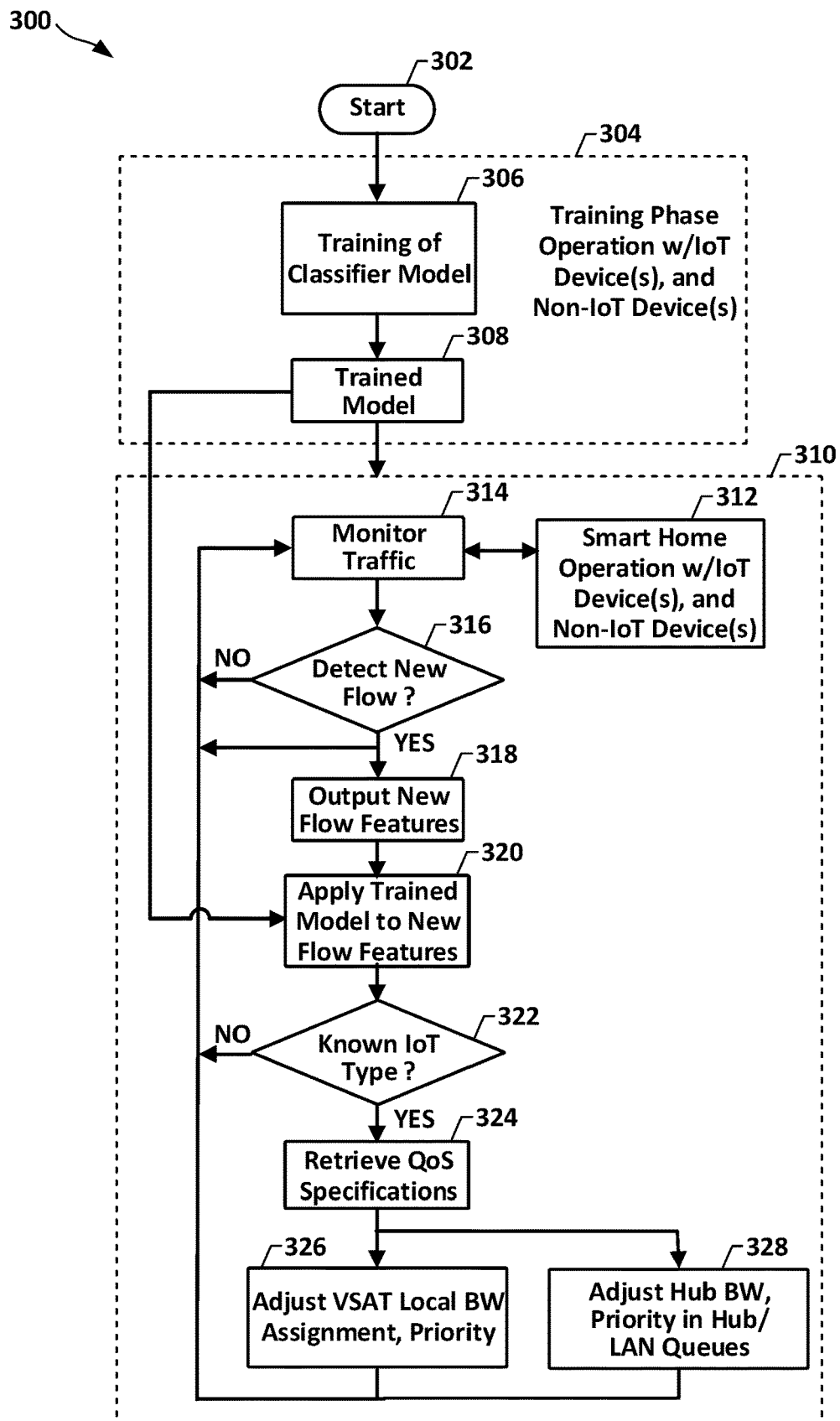
FIG. 3 is a flow diagram of example operations in processes in training and applying a machine learning IoT device type classifier, for fingerprint based classification of IoT device type, and corresponding real time adaptive allocation and access priority to VSAT bandwidth.

FIG. 3 is a flow diagram of example operations in processes 300 in training and applying a machine learning IoT device type classifier, for IoT device detection and type classification, and IoT type-based adaptive allocation and prioritization of access to VSAT bandwidth. Description of example aspects and features of the flow 300 will make reference to the FIG. 1 system 100. Such reference is for convenience of tracking described example operations relative to an already described example system. It is not intended to limit practices according to the flow 300 to being on the system 100. An example instance of the flow 300 can proceed from an arbitrary start state 302 to a training phase or mode 304, which can include applying operations at 306 for training an IoT device type classifier 308 to implement, for example, the system 100 IoT device type classifier 138. Specific operations and combinations of operations applied at 306 can be defined in part by the type of IoT device type classifier 308. For example, if the classifier 308 is a neural network classifier, operations and combinations thereof applied at 306 can be configured according to one or more machine learning processes for training neural network classifiers.

One example training process can be "supervised." Example implementations of supervised training processes that may be applied at 306 are described in greater detail later in this disclosure. These include, but are not limited to, process(es) described in reference to FIG. 4.

In an implementation, training processes applied at 306 can include, alone or in combination with supervised training, an "unsupervised" training. One example type of unsupervised training process that can be applied is "k-means clustering." k-means clustering can be applied to network and application layer attributes of traffic across many types, brands, and functionalities IoT devices. In overview, instances of k-means clustering can include starting with a number, N, of bins, and applying an iterative clustering of the IoT device types into the N bins. The value N can be adjusted. Various known techniques of k-means clustering can be used. Such techniques are described by a large number of readily available publications and, therefore, further detailed description is omitted.

An aspect of configuring the training at 306 as a k-means clustering, is that the clustering indicates that IoT device types within each cluster have particular similarities. The clustering, however, does not necessarily provide explicit identification of the specific type or types of IoT devices that are within each of the N clusters. Irrespective of this aspect, though, k-means clustering can be used at 306, and can provide at 308 a useful classifier 308 for practices of systems and methods according to this disclosure. Benefits of such implementation can include, but are not limited to, the following: once a device is classified using the supervised learning approach, a similar type of device can be easily identified without going through expensive training phase. Also, unsupervised learning can be preferable in some applications, such as when no labeled data can be available from IoT devices, i.e., no labels can be derived from a training process.

Implementations of unsupervised training at 306 are not limited to k-means clustering. Alterative implementations can include, but are not limited to, mean-shift clustering, agglomerative hierarchical clustering, and Expectation-Maximization clustering using Gaussian mixture.

It will be understood that the training at 306 is not necessarily applied as a one-time operation. On the contrary, the training 306 can be repeated, for example, and without limitation, in a periodic manner, or in accordance with a schedule, or in accordance with a selected or specified frequency or average frequency of training repeats, or any combination or sub-combination thereof. Particularities as to schedule, frequency or average frequency, or other parameters other.

Resources for performing training operations at 306 can include, for example in the FIG. 1 VSAT 122, general purpose programmable processor resources (not explicitly visible in FIG. 1), coupled to a memory resource (not explicitly visible in FIG. 1) that can store machine-executable instructions that, when executed by the processing resource, cause the processing resource to perform such training process(es). Example implementations are described in greater detail in reference to FIG. 12.

Referring to FIG. 3, upon completion of the training operations at 306, yielding the trained IoT device type classifier 308, the flow 300 can proceed to 310 and enter an operational phase or mode. Operational flow at 310 can be in the context of normal operations at 312 of one or more of the FIG. 1 IoT devices 132, as well as one or more of the NIDs 134. Operations at 310 can include operations at 314 of monitoring a traffic, for example, on a VSAT local link that carries traffic, including IoT traffic, for transmission on an inroute carried in part by the VSAT-to-satellite uplink 134, toward the satellite GW 108. Referring to FIG. 1, examples of operations at 310 can be performed by the flow monitor 136 connecting, e.g., via a network tap, to the hub 130.

Detection of a new traffic flow, e.g., by monitor operations at 314 is shown by the "YES" outbranch from decision block 316 and, in response, the flow 300 can proceed to 318 to output or retrieve extracted flow features, and then to 320 where operations can apply the extracted flow features to the trained classifier model 308 resulting from the training operations at 306. In response to operations at 320 not indicating the new flow detected at 316 corresponds to a known IoT type, i.e., not being among the IoT device types for which classifier model 308 was trained at 306, the flow 300 can return to 314 via the "No" outbranch of decision block 322. It will be understood that "return to 314" relates to the flow path of 300 for the particular new flow that was detected 316 but then determined at 322 as not matching a known IoT device type. Monitoring operations at 314 are not necessarily halted or terminated in response to each detection at 316 of a new flow.

In response to operations at 320 indicating the new flow detected at 316 as matching one of the IoT device types for which classifier model 308 was trained at 306, the flow 300 can proceed from the "Yes" outbranch of decision block 322 to 324. Operations applied at 324 can include, based for example on an identifier of the matching IoT device type, retrieval of QoS specifications for that particular IoT device type. Referring to FIGS. 1 and 3, operations at 324 can be performed, for example, by the QoS selection logic 142. The process 300 can then proceed, for the particular detection at 316 that, at 322-324, matched an IoT device type for which the classifier model is trained, to 326, or to both 326 and 328. Operations at 326 can be configured to allocate uplink resources of the VSAT 122 in a manner that can carry traffic associated with the subject IoT device, with a QoS sufficient to meet the IoT device type requirements. Such operations can include, for example, assigning time slots on the uplink 126. Operations at 326 can also include assigning uplink traffic from the subject IoT device to a particular one of the priority queues 148, or assigning a higher priority de-queuing to said traffic, or both.

In addition, in an instance of the flow 300 performed on a system according to the FIG. 2 system 200, operations applied at 326 can include selecting, e.g., via the satellite modem selector 220, between the GEO modem 128 and the LEO modem 218.

Operations at 328, if included, can be configured to allocate bandwidth of the hub 130, or assign access priority to the hub resources, or both, in a manner that efficiently applies sufficient hub resources such that, in combination with operation of the VSAT local uplink BW manager 146 in allocating uplink resources, can meet the QoS selected by the QoS selection logic 142. Operations at 328, if included, can be controlled at least in part by the BW/priority manager 154. Such operations can include, for example, assigning the IoT device traffic to a higher priority queue, e.g., among the hub/LAN priority queues 152, and de-queuing from the queues 152, or both.

As will be described in greater detail later in this disclosure, further implementations can include, for example, in the VSAT 122 of system 100 or comparable VSAT terminal of system 200, a configuration of block 326 can include providing for the VSAT 122 to send, for example, to a network inroute manager a request for additional uplink bandwidth. Examples of such implementations are described in greater detail later, including in reference to FIGS. 5 and 6.

Figure 4:
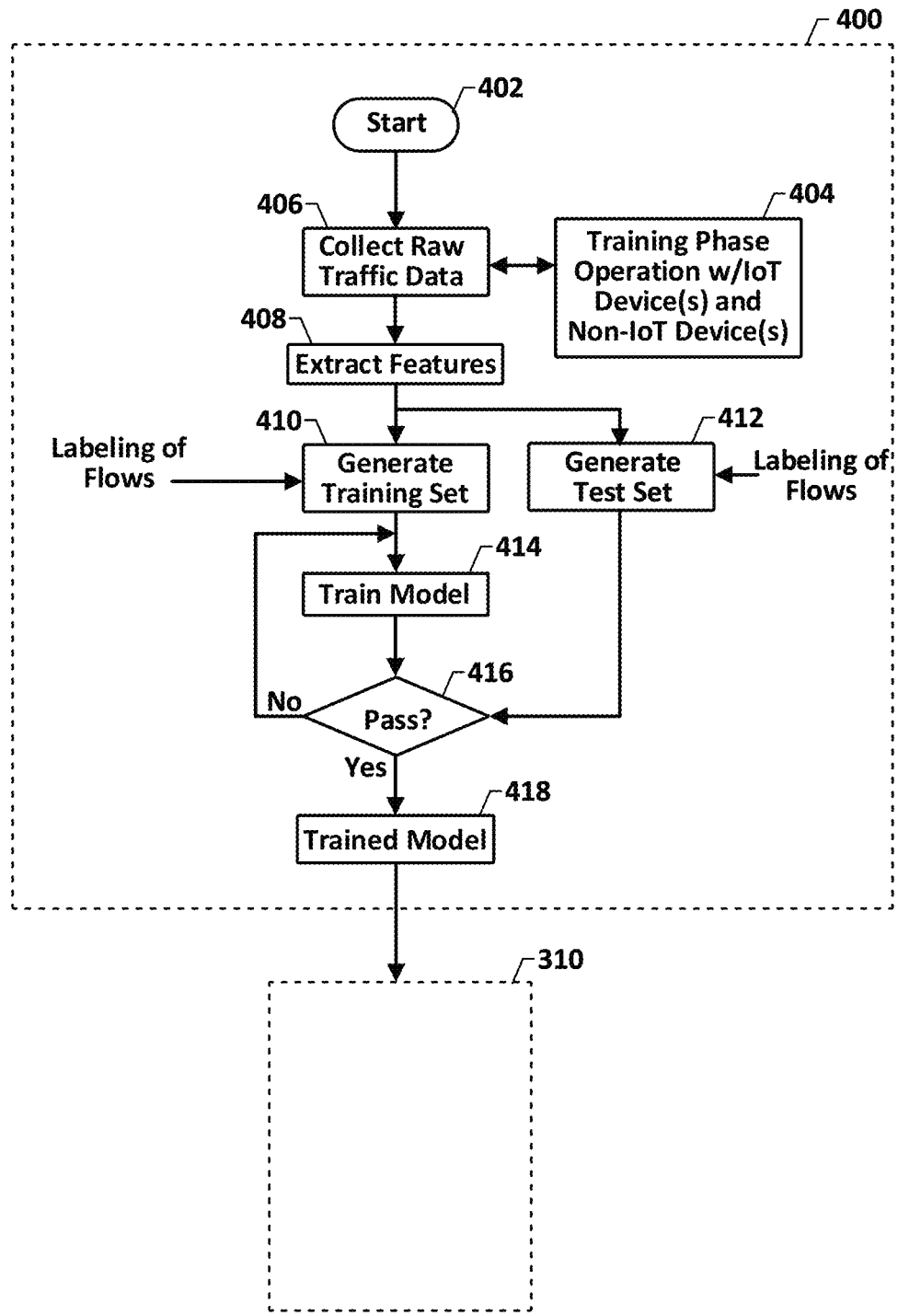
FIG. 4 is a flow diagram of example operations in a process, within the FIG. 3 example flow, for supervised machine learning of a fingerprint based IoT device type classifier.

FIG. 4 is a flow diagram of example operations in a process 400 for supervised machine learning training of a fingerprint based IoT device type classifier, which can be an implementation of FIG. 3 flow 300 blocks 306 and 308. As described above, resources for performing process 400 or operations or portions thereof, and which can be included in system 100, system 200, and other systems disclosed herein, are described later, for example, in reference to FIG. 12.

Referring to FIG. 4, an instance of the flow 400 can include proceeding from an arbitrary start at 402 to 404 where traffic can be generated by and in association with an assortment of different types of IoT devices different types of non-IoT devices. Concurrent with operations at 404, the flow can include, at 406, monitoring the corresponding traffic to collect raw traffic data. The flow 400 can proceed from 406 to 408, where operations can be applied for extracting features from the raw traffic data. Examples of such features that can be extracted from the network traffic of IoT devices can include, but are not limited to:

Ratio between incoming and outgoing bytes
Average time to live
Packet size distribution
Inter-arrival time distribution
Distribution of active and sleep times
Traffic load and signaling pattern
Whether the communication from IoT devices is local, e.g., within a wireless sensor LAN and/or is external, e.g., with servers on the public internet
Mean rate
Ratio of mean rate to peak rate From 408 the flow 400 can proceed to 410 and 412 to generate, respectively, a training data and a test data. Operations at 410 and 412 can include label each flow and the extract statistical properties. Examples can include, but are not limited to, can include

TABLE 1

| Packet Size |
| --- |
| average |
| minimum |
| maximum |
| standard deviation |

TABLE 2

| Inter Packet Delay |
| --- |
| average |
| minimum |
| maximum |
| standard deviation |

Other properties (such as port number, tcp/udp/icmp, etc.) from the raw data can also be used to create training data.

The flow 400 can proceed from 410 and 412 to a loop formed by 414 and 416, which can iteratively construct and train a classifier model, and can continue looping until operation at 416 detects a loop exit condition, for example, the classifier model having accuracy meeting a minimum allowable level. Implementation and configuration of the operations at 414 and 416 can depend on the type of classifier model being constructed and trained. For example, assuming the intended classifier model is a deep neural network, each iteration can include, at 414, adjusting the model weights and feeding the training data to the adjusted classifier model followed by determining, for example based on the test data generated at 412, if the adjusted model shows sufficient accuracy. Upon meeting the condition at 416, the flow 400 can result, as shown by block 418, in a trained neural network classifier.

Figure 5:
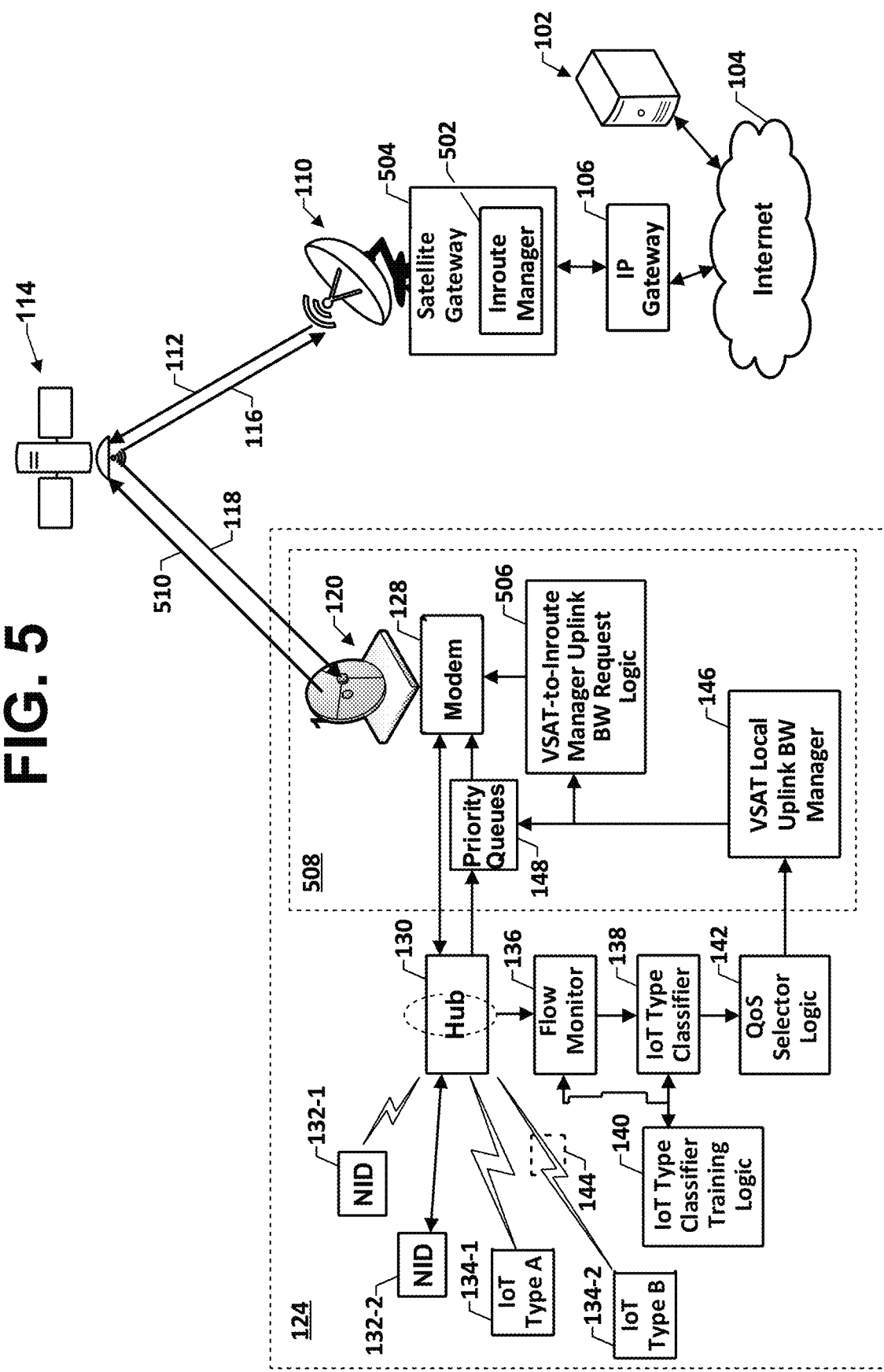
FIG. 5 is a block schematic of one example system for IoT device detection and type classification, with IoT type-based adaptive allocation and access priority to VSAT bandwidth, in combination with IoT type-based system allocation of bandwidth to VSATs.

FIG. 5 is a block schematic of one example system 500 for IoT device detection and type classification, and type-based allocation and prioritization of access to VSAT bandwidth, in combination with IoT type-based system allocation of bandwidth to VSATs. The example implementation of system 500 visible in FIG. 5 is shown as a modification of the FIG. 1 system 100. This is to assist in focusing description on particular concepts, and example features and operations illustrative of same. It is not intended to limit implementations of system 500 to being a modification of system 100. Like numbered blocks have functions, aspects, and features as described above in reference to FIG. 1 and therefore, for the sake of brevity, description of same is not repeated here, except where incidental to a described operation or feature.

One example implementation of system 500 can be realized by the following modifications to system 100: adding, for example by including in satellite GW 108, an inroute manager 502, this modification being visible in FIG. 5 as satellite GW 504; and adding, for example by including in VSAT 122, a VSAT-to-inroute manager BW request logic 506, this modification appearing in FIG. 5 as VSAT 508. Implementation of the inroute manager 504 can be for example, as described in U.S. Pat. No. 8,687,493, filed Nov. 29, 2011 and issued Apr. 1, 2014 (hereinafter "the '493 patent"), and which is hereby incorporated by reference in its entirety. Implementation of the VSAT-to-inroute manager BW request logic 506 can include an adaptation of VSAT bandwidth request features described in the '493 patent. For example, the VSAT-to-inroute manager BW request logic 506 can be configured to monitor the priority queues 148 and, for example, based in part on backlog of the queues 138, to send a request to the inroute manager 502 for additional bandwidth. For example, the VSAT-to-inroute manager BW request logic 506 may send such a request in response to the IoT type classifier 138 classifying a device as an IoT device type with QoS requirements that cannot be met in view of current queuing backlog and current allocated uplink 510 bandwidth BW.

Figure 6:
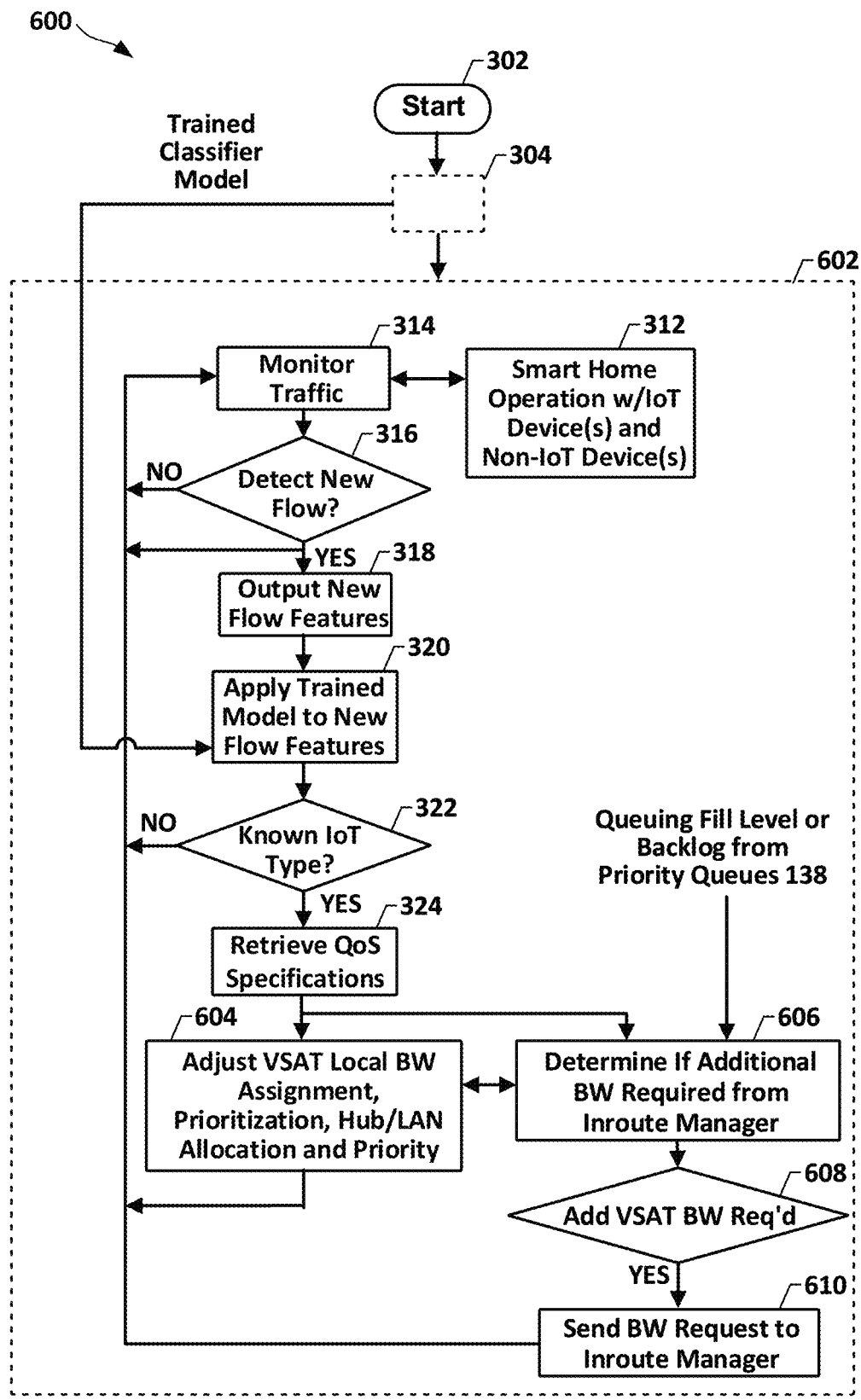
FIG. 6 is a flow diagram of example operations in processes in training and applying a machine learning IoT device type classifier, for fingerprint based classification of IoT device type, and corresponding real time adaptive allocation and access priority to VSAT bandwidth, in combination with IoT type-based system allocation of bandwidth to VSATs.

FIG. 6 is a flow diagram of example operations in processes 600 in training and applying a machine learning IoT device type classifier, for IoT device type-specific adaptive allocation of VSAT bandwidth, in combination with VSAT IoT type-based requesting of bandwidth. The example implementation of 600 visible in FIG. 6 is shown as a modification of the FIG. 3 flow 300. This is to assist in focusing description on particular concepts, features and operations illustrative of same. It is not intended to limit implementation of 600 to being a modification of flow 300. Like numbered blocks have functions, aspects, and features as described above in reference to FIG. 3 and therefore, for the sake of brevity, description of same is not repeated here, except where incidental to a described operation or feature. In an instance of the flow 600, operations can proceed from the above-described start 302, to training at 304 and, from the training at 304, to 602. Operations applied at 602 can include operations applied at 312 through 324, as described in reference to FIG. 3. Operations at 602 can also include, as represented by FIG. 6 block 604, the FIG. 3 operations described in reference to blocks 326 and 328.

Aspects of the flow 600 not described in reference to the flow 300 can include, e.g., after retrieval of QoS specifications at 324 and in association with or with some portions of operations at 604, proceeding to 606. At 606 operations can be applied to determine if the VSAT requires additional uplink bandwidth to meet the IoT device type-specific QoS identified at 324. Operations applied at 606 can include detecting backlog levels in the priority queues 148. In an implementation, operations at 606 can be parallel to, or can be incorporated within the operations at 604. If the determination at 606 is that additional VSAT BW is necessary, the flow 600 can proceed, as shown by the YES outbranch of decision block 608, to 610, where the VSAT can apply operations to send a request for bandwidth to the inroute manager 502.

Referring to FIGS. 1, 3, and 5, system 100, the flow 300, and the FIG. 5 system 500 are described with reference to one example VSAT terminal, e.g., VSAT terminal 122 and the VSAT terminal 506. Another implementation according to FIG. 1 can include multiple VSAT terminals, each configured generally as VSAT terminals 122. In one example of such implementation, all the VSATs can include its own classifier model 138. Training of each can be as described above in reference to FIG. 4. However, since the different VSATs may be associated with respectively different customer premises, there may be different sets of IoT device types used in their respective training. Each of the different VSATs may therefore provide an acceptable accuracy, for the IoT device types it was trained with. This can impose various costs. For example, for each instance of a VSAT 122 classifier model 138 encountering an unrecognized IoT device type, the VSAT's QoS selection logic 142 may mis-allocate bandwidth, or an improperly assign priority for the IoT device's traffic. In systems such as satellite communications, such misallocation and improper assignment can be costly. In addition, in at least some instances of the VSAT 122 classifier model 138 encountering an unrecognized IoT device type, a quality of service rendered or provided by the IoT device can be degraded from the level that may be provided for recognized IoT device types.

One example alternative implementation system according to this disclosure can provide a substantial reduction in the above-described occurrences of system 100 encountering unrecognized IoT device types and, in turn, reduce corresponding system costs. In one example implementation, a plurality of VSATs can be configured as the system 100, and each can be trained with a respective assortment of IoT device types, as described. A server can also be provided, with logic that can receive the different VSATs' trained models, as partial models, and can combine the partial models into what may be termed a superset classifier. An implementation of such server logic can also provide distribution or downloading, to many VSATs, of the superset classifier model. Features and benefits of such implementations can include, without limitation, classifier models such as the system 100 wherein prior to a new type of IoT device being introduced onto a VSAT serviced premises 122, the classifier model 138 is already present.

Another system in accordance with this disclosure, which can be implemented based in part on the FIG. 1 system 100, the FIG. 2 system 200, or the FIG. 5 system 500, can include a central resource, e.g., server, logic and a corresponding VSAT client logic that can provide collective training of classifier model. Features can include pooling of data and processing resources of thousands, hundreds of thousands, or millions of VSATs. In an example, a server can be included, which can include resources for instantiating what will be labeled, for purposes of description, as a "baseline model" or "BM." It will be understood that as used in this description the phrase "baseline model" and its abbreviated form "BM" are only labels; they have no intrinsic meaning regarding classifier model type, model architecture, model principle of operation, model arithmetic operations, model logic operations, or the technologies for implementation(s) of the model.

The BM can be implemented, for example, as a neural network classifier model. The instantiation can include a supervised training. The supervised training can include, generally, aspects and features comparable to those described above in reference to FIG. 4, block 406. In one more aspects, the centralized resource, e.g., server configuration can provide distribution or download of the BM to a plurality of VSATs. One example VSAT implementation can generally include the VSAT terminal 122, configured with an installed client that, for example, under control of the server, can perform or cause other resources of the VSAT to perform a retraining of the BM, and upload the retraining results to the server. The central resource, e.g., the server, can further include logic for merging or combining the uploaded retraining results and logic that, based in part on the combining, can generate and distribute an updated BM.

Figure 7:
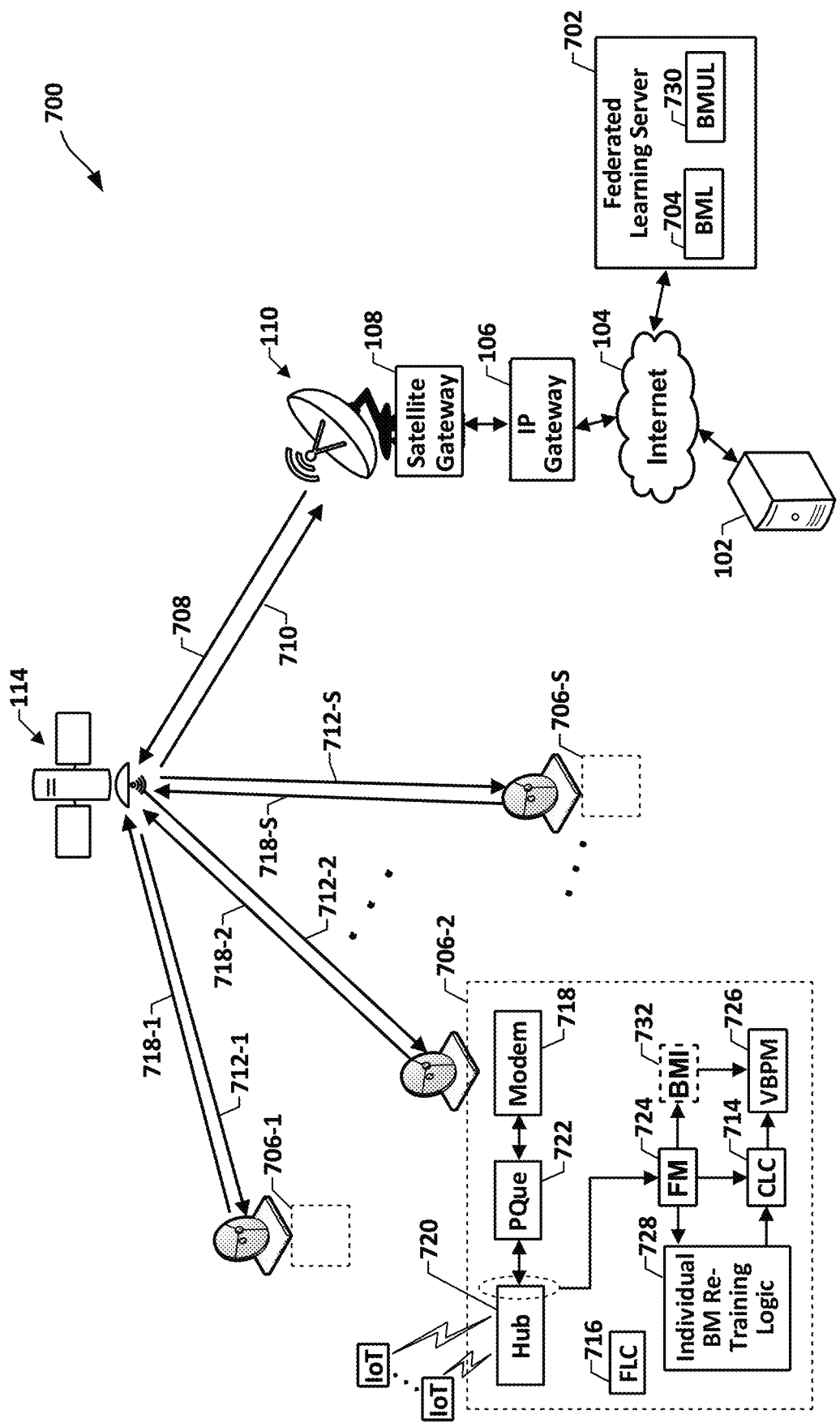
FIG. 7 is a block schematic of an implementation of a system for fingerprint based detection and classification IoT device type, and IoT type-based adaptive allocation and access priority to VSAT bandwidth, with server distribution of baseline classifier model (BM), and federated multiple VSAT retraining, with centralized update and redistribution of BM.

FIG. 7 a block schematic of an implementation of a system 700 for fingerprint based detection and classification IoT device type, and IoT type-based adaptive allocation and access priority to VSAT bandwidth, with server distribution of BM, and federated multiple VSAT retraining, with centralized update and redistribution of BM.

For brevity, system 700 will be described as based in part on the FIG. 1 system 100, with common blocks maintaining the FIG. 1 block numbering. It will be understood that such description is for convenience and is not to be understood as a preference as to implementations of federated learning according to this disclosure.

The system 700 can include a server 702 that can include a BM logic 704 that can store a BM and distribute or push copies of the BM to each of a first VSAT 706-1, second VSAT 706-2, . . . , Sth VSAT 706-S (collectively "VSAT terminals 706"). The population S can be arbitrary. Example populations can be in the tens, hundreds, thousands, hundreds of thousands or more. As visible in FIG. 7, VSAT terminal 706-2 is arbitrarily selected for enlarged view of functional blocks that can be representative of functionalities common to all VSAT 706. Alternatively, the VSATs 706 can be configured to send a request to the server 702, for example in response to an event such as start-up or reset.

There can be a forward uplink 708 and reverse downlink 710 between the satellite GW 108 and the satellite resource 114. The FL server 702 can push copies of the BM to the VSATs 706, for example, via the Internet 104, IP GW 106, and satellite GW 108, over forward uplink 708 to the satellite resource 114, and then to the VSAT terminals 706 via forward downlinks 712-1, 712-2, . . . 710-S (collectively "forward downlinks 712"). Each of the VSATs 706 can, in turn, store the received BM as a VSAT centralized classifier local copy (CLC) 714. The VSAT CLC 714 can be stored, for example, in a VSAT centralized classifier copy storage (not separately visible in FIG. 1). The VSAT centralized classifier copy storage can be implemented by a memory resource (not separately visible in FIG. 7).

In an aspect, various operations of the VSAT terminals 706 can be controlled, at least in part, by a client application such as the VSAT terminal 706-2 federated learning (FL) client 716. As described in greater detail later in this disclosure, certain of such operations can relate to scheduling and sequencing of terminal 706 processes in retraining of the VSAT CLC 714.

In one implementation, instantiation of the BM can include reception at the FL server 702, for example, from a source external to FIG. 7. In another implementation, the FL server 702 can include a BM instantiation/training logic (not separately visible in FIG. 7) that can apply, for example, to a BM template a training process to form the initial configuration of the BM 704.

Each of the VSATs 706 can include, either as a single device or a combination of devices, a modem 718, and a hub 720 that can connect to the modem 718. The connection can be direct or, for example, through a queuing block 722, or both. Each VSAT 706 can include a flow monitor 724 (labeled "FM" 724 in FIG. 7) that can feed flow data to the VSAT CLC 714. Each of the VSATs 706 can include a VSAT bandwidth manager (labeled "VPPM" on FIG. 7) 726.

Functionality of the VSAT bandwidth manager 726 can include the above-described QoS selector logic 142 of the FIG. 1 system 100. The modem 718 can correspond, for example, to the FIG. 1 system 100 modem 128. Functionality of the flow monitor 724 can include the above-described functionality of the system 100 flow monitor 136. Configured as such, each of the VSATs 706, after receiving and storing the original pushed BM as the current VSAT CLC 714 can proceed to a process such as block 310 of the FIG. 3 process 300.

At some time, or in response to some event or condition, a system 700 resource (not explicitly visible in FIG. 7) can send notification to all of, or to some of the S VSATs 706, to apply a retraining to their respective VSAT CLC 714. The FL client 716 can be configured such that, in response to such notification, it immediately switches the VSAT 706 to a federated training mode. In the federated training mode, the VSAT 706 can first generate training data and test data and then, at a later time, can apply retraining operations on its VSAT CLC 714 to form an individually updated CLC (not separately numbered). The VSATs 706 can be configured or controlled by the FL client 716 to apply the training in two parts. The first part can include generating and storing training data. The second part can be performing the retraining, for example, when the VSAT 706 has time and resources.

Functionality of the VSAT individual retraining logic 728 can include uploading, to the FL server 702, the individually updated CLC resulting from the re-training. The FL server 702 can include a centralized classifier updating logic 730 (labeled "BMUL" 730 in FIG. 7) that can be configured to perform an updating of the most recently pushed centralized classifier model, the first of which was the BM, based on a combining of multiple uploaded individually updated CLCs. In implementations described in greater detail later in this disclosure, features of the centralized classifier updating logic 730 can include conditioning its updating process on receiving a threshold population of uploaded updated CLCs. Another feature of the centralized classifier updating logic 730 can include performing a combining of the uploaded individually updated CLCs. Other combining modes are described in greater detail later in this disclosure. The result can be an updated centralized classifier model 704. The FL server 702 can include logic (not separately labeled in FIG. 7) for downloading or pushing the updated centralized classifier model to the VSATs 706, as a new centralized classifier model. In an implementation, described in greater detail later in this disclosure, the server 702 can include a qualification logic that can be configured to push the updated centralized classifier model, as the new centralized classifier model, only if an accuracy improvement condition is met.

In various applications, considerations in the selection of the type of classifier model for implementing the baseline model can include combinability of individually retrained copies, e.g., and performance effects of such combining. For example, deep neural networks, identified above as one implementation of the BM 704 can be combined, e.g., as described above in reference to centralized classifier updating logic 730. There can be applications, though, wherein particular requirements or target performance, e.g., with respect to particular IoT device types, may be easier met or easier supported through classifier model types that may not be as readily combined. The FIG. 7 implementation of system 700 can provide for such applications, as it can include in one or more of the VSAT 706s, in addition to the described BM and updates thereof stored as CLC 714, one or more individual classifier models, such as the representative BMI 732. As visible in FIG. 7, the BMI 732 can be configured to selectively receive feature data from the feature monitor 724 and provide the classification result to the VSAT bandwidth manager 726. Therefore, VSAT 706 operations and performance with the BMI 732 enabled, with respect to detection and classification IoT device type, and corresponding adaptive allocation of uplink resources, can be as described above, for example, in reference to FIGS. 3 and 6.

Figure 8:
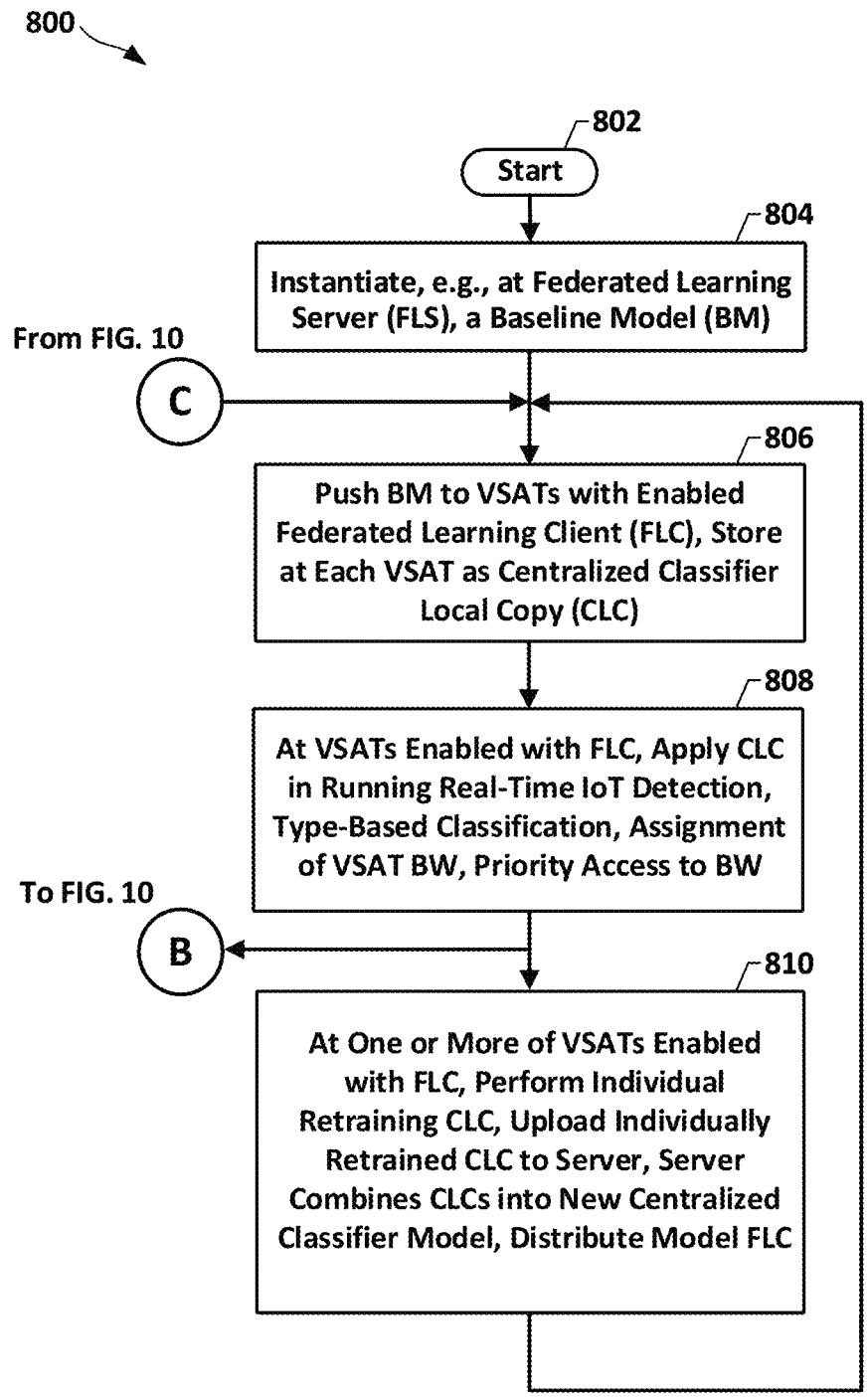
FIG. 8 is a flow diagram of example operations in processes of server distribution of BM, VSAT application of BM for fingerprint based detection and classification IoT device type, and IoT type-based adaptive allocation and access priority to VSAT bandwidth, and in processes of federated multiple VSAT retraining of BMs, and corresponding centralized update and redistribution of BM.

FIG. 8 is a flow diagram of example operations in processes 800 of FL server distribution of the original BM, VSAT application of the BM for IoT device detection, type classification, type-based QoS selection, and carrying of IoT device traffic, and federated retraining of the BM. For brevity, description of example interactions and performances of operations will be in general reference to the FIG. 7 system 700.

One instance of the flow 800 can proceed from an arbitrary start 802 to 804, where operations can be applied for instantiating a BM. An example instance of flow 800 can proceed from 804 to 806 and where operations can push the instantiated BM from the federated learning server to VSATs enabled with FLC. Referring to FIGS. 7 and 8, example operations at 806 can include the FIG. 7 FL server 702 pushing the instantiated BM from the BM logic 704 to the VSATs 706 running the FL client 716. Each of the FL client 716 enabled VSAT 706 can then download the instantiated BM from the FL server 702 and store the BM as the VSAT CLC 714.

From 806 the flow 800 can proceed to 808, where, at FL client 716 enabled VSATs 706 that have received and stored the original BM as a the VSAT CLC 714, operations can be applied that can provide real-time IoT device detection, IoT type-based classification and assignment of VSAT BW, or priority of access to VSAT BW, or both. Operations at 808 can be, for example, as described in reference to FIG. 3, block 310.

The flow 800 can maintain operation at 808 until for example, receipt of a command or instruction or detection of another event defined as a trigger for a federated retraining of the VSAT 706 CLCs 714. The flow 800 can then proceed from 808 to 810 and apply operations that can include, at one or more of the VSATs 706 enabled with FL client 716, individual retraining of the centralized classifier copy received and stored at 806, to form an individually updated centralized classifier, and uploading the individually updated centralized classifier to the FL server 702. Some operations at 810 can be applied by the FL server 702, such as combining the uploaded locally updated centralized classifiers into an updated centralized classifier model and pushing the updated centralized classifier model to the VSATs 706 enabled with the FL client 716, as a new centralized classifier copy.

Figure 9:
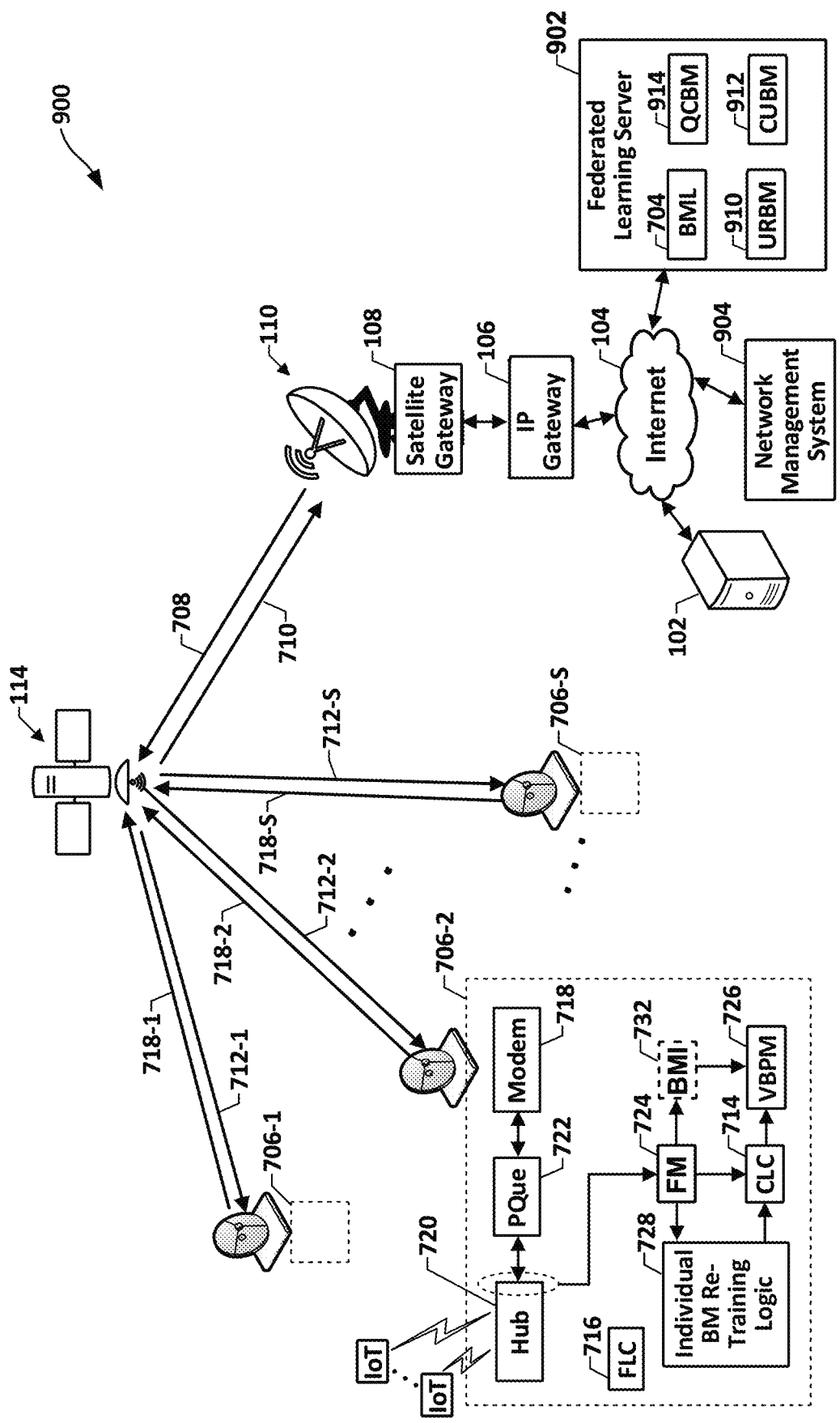
FIG. 9 is a block schematic of implementation of a system for fingerprint based detection and classification IoT device type, and IoT type-based adaptive allocation and access priority to VSAT bandwidth, with server distribution of BM, with federated multiple VSAT retraining of BMs and upload of same, with associated server updating and conditional redistribution of BM.

FIG. 9 is a block schematic of one implementation of a system 900 for fingerprint based detection and classification IoT device type, and IoT type-based adaptive allocation and access priority to VSAT bandwidth, with server distribution of BM, federated multiple VSAT retraining of BMs and upload of same, with associated server updating and conditional redistribution of BM.

The system 900 can be implemented, for example, as an adaptation of the FIG. 7 system 700. As visible in FIG. 9, an example of such adaptation can include a modification of the FL server 702, referenced as 902 on the figure, in combination with an added network management system 904, in further combination with a particular implementation of the FIG. 7 VSAT individual retraining logic 728. As visible in FIG. 9, one example of the particular implementation of the VSAT individual retraining logic 728 can include a retraining logic (hereinafter "RTR logic") 906 and a training data storage 908.

The network management system 904 can be configured to instruct the VSATs 706 to initiate individual retraining of the VSAT 706 CLCs 714, for example, by transmitting to the VSATs 706 an initiate retraining instruction (not separately visible in FIG. 9). Example functions of the RTR logic 906 can include, in response to the receiving the initiate retraining instruction, causing or controlling the flow monitor 724 to load the FL Data storage 908 with training data. Other retraining functions of the RTR logic 906 can include controlling the training data storage 908 and VSAT CLC 714 to perform retraining iterations, until detecting an exit condition. In a neural network implementation of the server BM 704 and hence VSAT CLC 714, each of the retraining iterations can include, for example, an incremental adjusting of the CLC 714 neural network weights, then feeding the training data from 908 to the adjusted CLC 714, inspecting the classification result and, absent the result meeting the exit condition, again adjusting the neural network weights and repeating the process. An example exit condition can be the RTR logic 906 detecting a less-than-threshold per-iteration increase of classification accuracy.

In an aspect, the RTR logic 906 can be configured to control scheduling of the iterative individual retraining, for example, by collecting and storing training data 908 during regular operations of the VSAT 706, without commencing the retraining iterations and, at a later time, performing the retraining iterations.

The particular modification of the FL server 702 referenced as 902 on FIG. 9 can include an upload individual retrained BM (hereinafter alternatively referred to "URBM") logic 910, a combine uploaded individually retrained BM (hereinafter alternatively referred to "CUBM") logic 912, and a qualification of combined retrained BM (hereinafter alternatively referred to "QCBM") logic 914.

The RTR logic 906 can be configured such that, in response to detecting termination of the above-described retraining, the logic 906 can upload the individually retrained CLC 714 to the FL server's URBM logic 910. The URBM logic 910 can be configured to increment a counter, or logical equivalent, upon each receipt of an uploaded individually retrained BMs and configured to cause or initiate, when the count meets what will be termed a "individual retrained BM count threshold," the CUBM logic 912 to combine the uploaded individually retrained CLCs into a combined model. In one implementation, the FL server 902 can automatically update its current centralized classifier model 704 based on a result of the CUBM logic 912 combining operations. In an implementation as visible in FIG. 9, wherein the FL server 702 includes the qualification of combined retrained BM logic 914, the FL server 902 can condition pushing the result of the CUBM logic 912 combining, on that result having an accuracy that is more than an update threshold. In other words, if the updated centralized classifier model meets improvement threshold, push it to the VSATs 706, and if not, do not push it.

Figure 10:
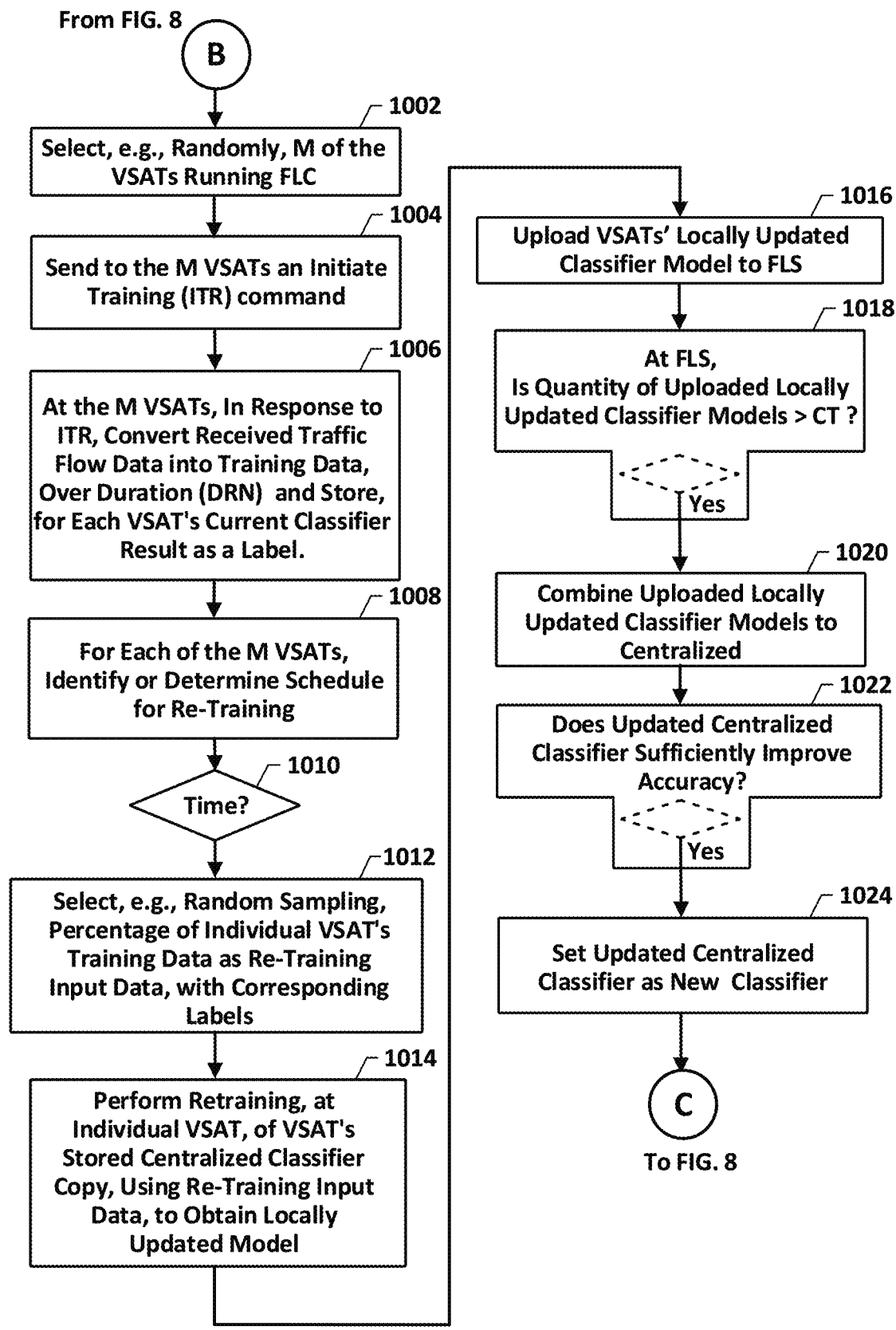
FIG. 10 is a flow diagram of example operations in one process of federated multiple VSAT retraining of BMs, upload of VSAT retrained BMs to server, centralized combining of uploads and conditional redistribution of BM based on same.

FIG. 10 is a flow diagram of example operations of a flow 1000 in one process of federated multiple VSAT retraining of BMs, upload of VSAT retrained BMs to server, centralized combining of uploads and conditional pushing of updated BM based on same. The FIG. 10 flow 1000 can be a detailed implementation of the FIG. 8 block 810, as shown by the connection points "B" and "C" that are visible both on FIG. 8 and FIG. 10.

It will be appreciated that many, e.g., hundreds of thousands, VSATs 706 can be running the federated learning client 716 and each can perform the FIG. 10 flow 1000 retraining on its VSAT CLC 714. Each of the many VSATs 706 configured with the FL client 716 can therefore, in addition to using the most recent new centralized classifier model pushed by the FL server 902, can participate in retraining of its copy of same, e.g., CLC 714, and in providing a new incremental CLC back to the FL server 902. This will be understood from the description above, and further understood from the following description of the flow 1000, including example operations and flow features.

In an instance of the flow 1000 can start at connection point "B" on FIG. 8, representing a population of VSATs running the FL client 716 and which have received the pushed new centralized classifier model from the FL server 702 (and 902) BM logic 704. From connection point B, the flow 1000 can proceed to 1002, where the network management system 904 can select, for example by random selection techniques, integer M of the VSATs 706 running the FL client 716. Contemplated values of M can be large, e.g., in the hundreds of thousands or millions, or can be smaller. The flow 1000 can proceed from 1002 to 1004 where operations, for example by the network management system 904, can send an initiate training command (hereinafter ""ITR command") to the M VSATs 706. The flow 1000 can proceed from 1004 to 1006, and from 1006 to 1012, as will be described in greater detail, the flow 1000 can be individual to each of the M VSATs 706.

From the perspective of each of the M VSATs 706 at 1006, specific response to receiving the ITR command can depend, at least in part, on the VSAT's present operational load. A general response, which can be performed while continuing its regular operations, can be an immediate or near-immediate conversion of received traffic flow data, e.g., from the flow monitor 724, to training data, and loading of the training data into the training data storage 908. This conversion of traffic flow data into training data, and storage of same in the storage 908, can continue for a duration (DRN). The value of DRN can be set, for example, by the ITR command. Operations applied at 1006 can also include, in an alignment with storing of the training data in storage 908, a loading of the VSAT 706 current BM classification of the IoT device corresponding to the traffic flow for which the training data was generated.

At 1008 each VSAT 706 can perform a scheduling operation, to set a time for performing its individual retraining process. FIG. 10 shows operations at 1008 performed after DRN. In such a case, the flow 1000 can proceed from 1008 to 1010 and wait with respect to performing the retraining. Conceivably, scheduling at 1008 can be performed during DRN. In such a case, operations at 1006 can be concurrent with the wait at 1010.

Features and benefits provided by flow portions 1006 to 1010 can include, but are not limited to, system-wide enablement for a large number, M, of VSATs 706, to participate in and contribute to a federated training of the originally pushed BM, as well as federated training of each subsequently pushed new centralized classifier model. This enablement, and other features, can be provided in part by each VSAT 706 starting, e.g., in response to the ITR command, its converting of raw input data (traffic flows) into training data and storing the training data locally in its storage 908, irrespective of the VSAT 706 not being in a position to actually run the model training at the time. This also enables each VSAT 706 to store training data and classification results from its current VSAT CLC 714, for retraining the current CLC 714 at a time convenient for that VSAT 706, for example, during its typical non-peak hours when processing and memory resources are minimally used.

At each of the M VSATs 706 that received the ITR command, upon its run of the flow 1000 reaching its 1010 scheduled retraining time, the flow 1000 can proceed from the "yes" outbranch of 1010 to 1012. For each VSAT 706 flow 1000 at 1012, operations can include the VSAT 706 selecting, as its BM retraining input data, a percentage of its training data stored in 908. The selecting at 1012 can use, for example, random sampling. The flow 1000 can proceed from 1012 to 1014, and perform the retraining using the random sampling at 1012. For purposes of description, a completion result of the retraining at 1014 will be referred to as a "locally updated classifier model." For implementations in which the originally pushed BM is a deep neural network, the locally updated classifier model can comprise updated model weights for the deep neural network.

Figure 12:
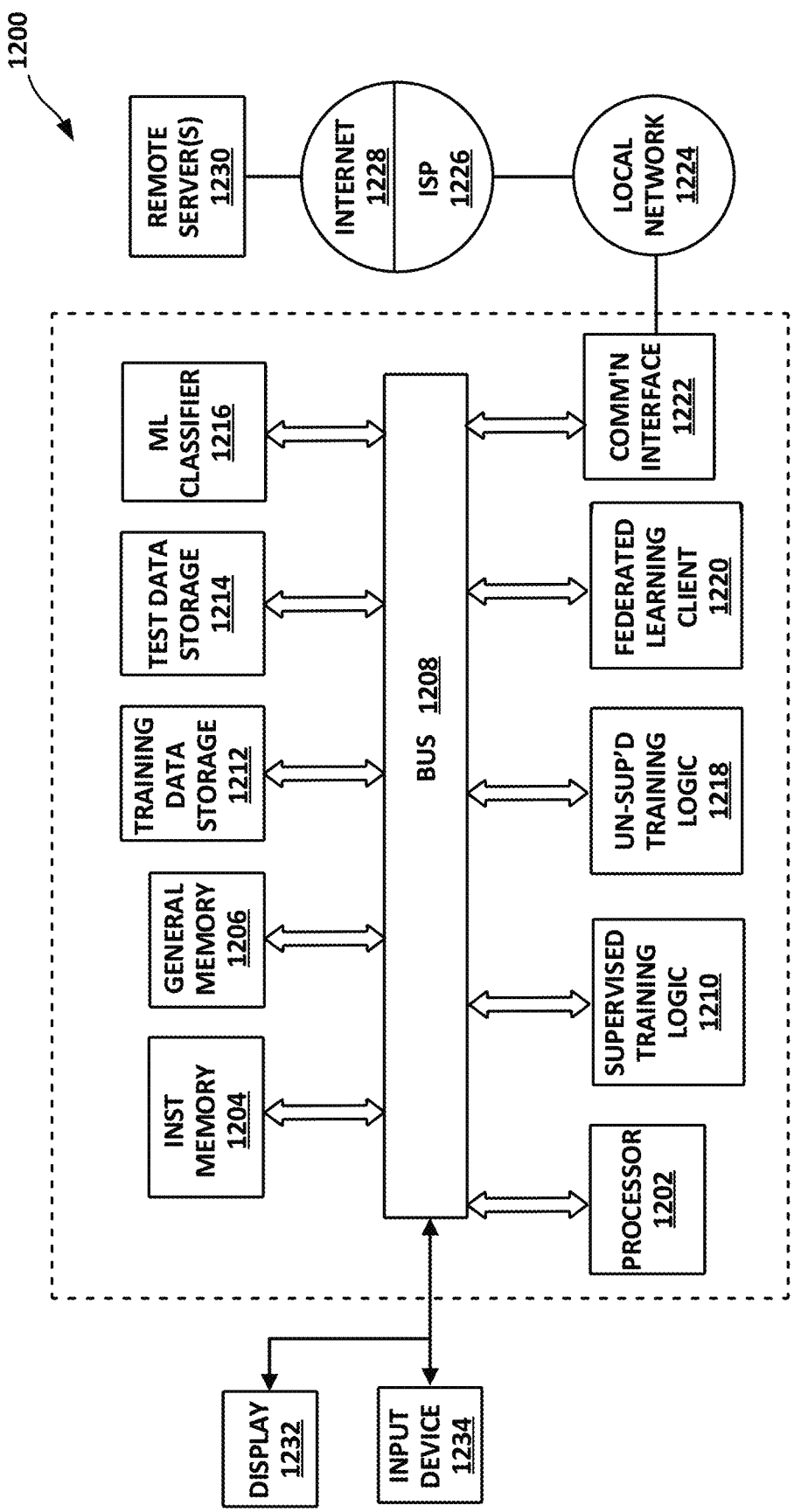
FIG. 12 is a block diagram that illustrates a computer system upon which aspects of this disclosure may be implemented.

Operations at 1012 and 1014 can be controlled by the FL client 716, the RTR logic 906, or both, and can be controlled by other processing resources of the VSAT 706, for example, as described in reference to FIG. 12.

Features and benefits of selecting, as retraining input data, a percentage of the training data stored in 908 during DRN instead of the entire training data include obviating or significantly reducing impact of not knowing with 100% certainty the correctness of the classification results used at 1006 for labeling the training data. In other words, there can be a percentage error rate in the labeling of training data as being IoT or non-IoT and, for IoT devices, some percentage error rate in the labeling of the IoT device type. The flow 1000 taking a sampling, for example 60%, of the training data for retraining the current model obviate or significantly reducing impact of the labeling error. The 60% sampling is only an example and is not intended as a limitation of practices according to this disclosure and is not a statement of preference. Without subscribing to any particular scientific theory, the obviating or significant reduction of such labeling error can be provided by the random sampling obtained at 1012 including some correct (mostly correct) and some incorrect classifications, and when this repeated retraining based on this data is done across, for example, hundreds of thousands of VSATs 706, the resulting locally updated classifier model will be an improvement over the originally pushed baseline model, and over each subsequently pushed new centralized classifier model.

Upon such completion of the retraining at 1014, the flow 1000 can proceed from 1014 to 1016, at which the VSAT 706 can perform operations of uploading the locally updated classifier model to the FL server 902. In certain applications, at one or more of the VSATs 706, the uploading at 1016 can be performed when the locally updated classifier model is complete, and can be repeated, for example, at non-peak hours when the network utilization is at its lowest.

Corresponding to the uploading at 1016, operations at the FL server 902 can include receiving, e.g., at the URBM logic 910, the locally updated classifier model. As described earlier, associated with each upload can be an incrementing of a counter. For purposes of description the counter will be referred to as "uploaded locally updated classifier counter" (not separately visible in FIG. 10. In an implementation there can be a threshold for the count, at which the FL server 902 can perform a combining of the locally updated classifier models. The threshold can be, for example, a percentage of the VSATs 706 running the FL client 716, i.e., to which the ITR command was sent at 1004. For purposes of description the threshold will be alternatively referred to as "centralized classifier update threshold" or "CT." Block 1018 shows the operation determining if the uploaded locally updated classifier counter has reached CT.

The total time required for the URBM logic 910 the CT uploaded locally updated classifier models can be dependent on factors such as, for example, IoT device activity statistics at the VSATs 706, the numeric value of CT, and particular retraining scenarios at the VSATS 706. Examples can include approximately a day, multiple days, and less than a full day.

Upon reaching CT, the flow 1000 can proceed from 1018 to 1020 where operations, for example at the FL server 902, can combine the population of CT uploaded locally updated classifier models to create an updated centralized classifier model. Operations at 1220 can be performed, for example, by the FL server CUBM logic 912.

Assuming the originally pushed BM is a deep neural network, each of the uploaded locally updated classifier models, e.g., FIG. 9 VSAT CLC 714 can include, as described above, updated model weights for the deep neural network. In such neural network implementations, operations at 1220 can include averaging the weights of each link of the deep neural network reported by each VSAT. In addition to a simple average, other forms of statistical summaries for combining the weights will also be tried.

Optionally can proceed directly from 1020 to 1024, i.e., automatically download new model. Alternatively, can proceed from 1020 to 1022. At 1022 the new model can be passed through a battery of automated test on well-known new data collected from the lab. If the new model performs better than the current model, the new model can be marked as a candidate for download, if conditions are met, can be pushed to the VSATs as the new centralized classifier model.

In an implementation, operations at 1022 can include applying hysteresis filtering. The hysteresis filtering can condition the pushing of the new model as a new centralized classifier model, on the new model being more than a hysteresis threshold improvement over the current centralized classifier model. Benefits can include, but are not limited to, prevention of excess toggling between new and old models.

Figure 11:
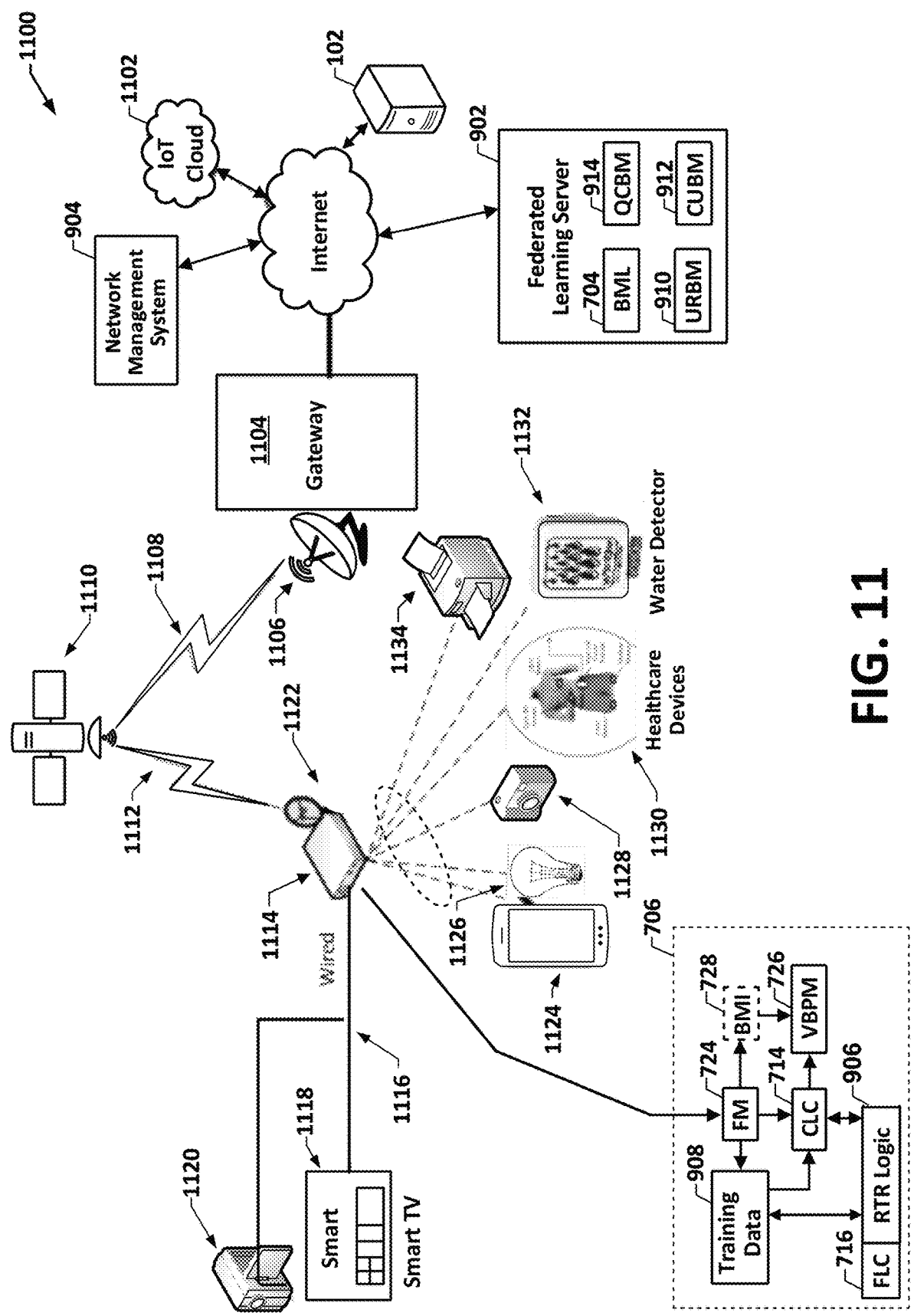
FIG. 11 is a simplified schematic showing an example application configuration, including example IoT devices and non-IoT devices, for implementations of a system or portions of a system in accordance with FIG. 1, 2, 5, 7, or 9, or various combination and sub-combinations thereof.

FIG. 11 is a simplified schematic showing an example configuration of a system 1100 combination of IoT and non-IoT devices, in one or more implementations of a system or portions of a system in accordance with FIG. 1, FIG. 2, FIG. 5, FIG. 7 or FIG. 9. The system 1100 can include the IoT server 102 described above, or an IoT cloud server resource 1102, or both, connected through the Internet 104 to a gateway 1104. The gateway 1104 can be, for example, a combination of the IP gateway 106 and satellite GW 108 described above. The gateway 1104 can connect to a radio frequency transmitter 1106 that can communicate via forward uplink/reverse downlink 1108 to a satellite resource 1110, which can communicate via forward downlink/reverse uplink 1112 to a VSAT terminal 1114. The VSAT terminal 1114 can include a hub/modem 1114, which can interface via a wired link 1116 to a smart television 1118 and a camera 1120. The hub/modem 1114 can interface vie wireless link or links 1122 with example devices such as a smartphone 1124, an IoT lightbulb 1126, various IoT healthcare devices 1130, an IoT water detector 1132, and a printer 1134.

The system 1100 can include, coupled to the hub/modem 1114, VSAT blocks of the FIG. 9 VSAT 706 and can include, coupled to the Internet 104, the FL server 902 of the FIG. 9 system 900, and can include the FIG. 9 network management system 904. In an example operation, the feature monitor 724 can monitor traffic, e.g., via the hub/modem 1114 and, by applying monitored traffic features to the centralized classifier local copy 714, can classify different ones of the above-identified example devices. The classification can include between being an IoT device and a non-IoT device and, if an IoT device, can classify the IoT device type. The VSAT BW management logic 726 can then assign IoT device type-specific QoS and assign corresponding VSAT uplink BW and uplink access priority. Example operations can therefore include, e.g., based on traffic features such as low packet count, the VSAT's centralized classifier local copy 714 classifying the IoT light bulb 1126 as a light bulb type IoT device, and the VSAT BW management logic 726 assigning an appropriate QoS. The QoS, for the light bulb type IoT device, can include a low guaranteed bandwidth, low priority, and therefore relatively large guaranteed minimum latency, and relatively high tolerance of dropped packets. The hub/modem 1114 can also be implemented with a QoS based control of hub bandwidth allocation and user device access priority to hub resources, such as described in reference to FIG. 1 blocks 152 and 154. In such an implementation, the QoS determined by the VSAT BW management logic 726 can be provided to the hub BW/priority manager 154. The manager 154 can respond by operations such as, but not limited to, assigning the traffic associated with the light bulb IoT device to a low priority queue among the hub/LAN priority queues 152. Example operations of the system 1100 can also include, based on characteristic packet statistics, classifying the IoT healthcare devices 1130 and assigning an appropriate QoS, and allocating corresponding VSAT uplink bandwidth and access priority. The QoS and allocated uplink bandwidth and access priority can be, for this example, a guaranteed low delay, high access priority, and minimal tolerance of dropped packets. In an implementation of the hub/modem 1114 that include the hub/LAN priority queues 152, and hub BW/priority manager 154, or equivalents thereto, the described QoS can be provided to the hub/modem 1114, for corresponding allocation of bub resources.

The system 1100 can run the FL client 908, and operations applied can include receiving the centralized classifier local copy 714, for example, from the BML logic 704 of the ML server 902, receiving a retraining instruction from the network management system 904 and, in response, generating a training data 908, and then scheduling and performing retraining operations.

FIG. 12 is a block diagram illustrating a computer system 1200 upon which aspects of this disclosure may be implemented, such as, but not limited to, particular logic blocks described in reference to FIG. 1. It will be understood that logic blocks illustrated in FIG. 12 represent functions, and do not necessarily correspond to particular hardware on a one-to-one basis. The computer system 1200 can include a data processor 1202, instruction memory 1204, and a general-purpose memory 1206, coupled by a bus 1208.

The instruction memory 1206 can include a tangible medium retrievably storing computer-readable instructions that, when executed by the data processor 1202, cause the processor to perform operations, such as described in reference to FIGS. 3, 4, 6, 8, and 10. The computer system 1200 can include supervised training logic 1210. Can include training data storage 1212, test data storage 1214. Can include machine learning classifier 1216; un-supervised training logic 1218; federated learning client 1220. The computer system 1200 can also include a communications interface 1222, configured to interface with a local network 1224 for accessing a local server 1214, and to communicate through an Internet service provider (ISP) 1226 to the Internet 1228, and access a remote server 1230. The computer system 1200 can also include a display 1232 and a user interface 1234, such as a touchscreen or keypad.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

In some examples implemented using computer system 1200, various machine-readable media are involved, for example, in providing instructions to processor 1202 for execution. Such a medium may take many forms, including but not limited to, non-volatile media, volatile media, and transmission media. Non-volatile media includes, for example, optical or magnetic disks. Volatile media includes such dynamic memory. Transmission media includes coaxial cables, copper wire and fiber optics, including the wires that comprise bus 1208. Transmission media can also take the form of acoustic or light waves, such as those generated during radio wave and infra-red data communications. All such media must be tangible to enable the instructions carried by the media to be detected by a physical mechanism that reads the instructions into a machine.

Various forms of machine-readable media may be involved in carrying one or more sequences of one or more instructions to processor 1202 for execution. For example, the instructions may initially be carried on a magnetic disk of a remote computer. The remote computer can load the instructions into its dynamic memory and send the instructions over, for example, a telephone line using a modem. A modem local to computer system 1200 can receive the data on the telephone line and use, for example, an infrared transmitter to convert the data to an infrared signal. An infrared detector can receive the data carried in the infrared signal and appropriate circuitry can place the data on bus 1208. Bus 1208 can carry the data to the instruction memory 1204, from which processor 1202 can retrieve and execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. The following claims are hereby incorporated into the Detailed Description, with each claim standing on its own as a separately claimed subject matter.

What is claimed is:

1. A system for fingerprint based detection and classification of Intent of Things (IoT) device type, and adaptive allocation and access priority to link bandwidth, comprising
   a processor; and
   a memory, coupled to the processor, storing executable instructions that, when executed by the processor, cause the processor to:
      monitor a link traffic and generate a corresponding feature data,
      classify the device, based at least in part on applying a machine learning classifier to at least a portion of the feature data, between being and not being an IoT device of a particular IoT device type; and:
      assign an IoT device type-specific quality of service (QoS) for carrying a traffic associated with the IoT device of the particular IoT device type, and allocate, for traffic associated with the IoT device of the particular IoT device type, resources of the link in accordance with the assigned IoT device type-specific QoS;

wherein to classify the device between being and not being an IoT device of the particular IoT device type includes to:

apply the feature data to a first classifier that is configured to classify the device between being an IoT device and being a non-IoT device and, apply, to a second classifier, an input that is based at least in part on the feature data of the IoT device, the second classifier being configured to classify the IoT device between being and not being the particular IoT device type.

2. The system of claim 1, wherein the instructions further include instructions that when executed by the processor cause the processor to at least partially train the machine learning classifier.

3. The system of claim 1, wherein:

the particular IoT device type is an IoT first device type, the QoS is a first QoS, the second classifier is further configured to classify the IoT device into one among a plurality of classes, the plurality of classes including an IoT first device type class, an IoT second device type class, and an IoT device null class that includes neither the IoT first device type nor the IoT second device type, and the executable instructions further include instructions that, when executed by the processor, cause the processor to assign a second QoS for carrying a traffic associated with the IoT device of the second device type class.

4. The system of claim 3, wherein the first QoS includes a guaranteed first bandwidth and the second QoS includes a guaranteed second bandwidth, the guaranteed second bandwidth being greater than a threshold, and the guaranteed first bandwidth being not greater than the threshold, and wherein system further includes:

a first modem and a second modem, the first modem having a first bandwidth and the second modem having a second bandwidth, the second bandwidth being greater than the first bandwidth, a hub, configured to wirelessly connect to an IoT device, and to carry an IoT traffic between the IoT device and a selectable one among the first modem and second modem, wherein the executable instructions further include instructions that, when executed by the processor, cause the processor to:

select the first modem in association with the second classifier classifying the IoT device into the IoT first device type class, and select the second modem in association with the second classifier classifying the IoT device into the IoT second device type class.

5. The system of claim 3, wherein:

the first QoS includes a first maximum delay guarantee, the second QoS includes a second maximum delay guarantee, the second maximum delay guarantee being different than the first maximum delay guarantee, to carry traffic for the IoT device in accordance with the first QoS includes to queue, in a queue, packets of the traffic associated with the IoT device and deque from the queue, according to a first priority, packets of the traffic associated with the IoT device, to carrying traffic for the IoT device in accordance with the second QoS includes to queue, in the queue, packets of the traffic associated with the IoT device, and deque from the queue, according to a second priority, packets of the traffic associated with the IoT device, and based at least in part on the first maximum delay guarantee being greater than the second maximum delay guarantee, the second priority is greater than the first priority.

6. The system of claim 5, wherein:

the queue includes a plurality of queues, to carry traffic for the IoT device in accordance with the first QoS further includes to:

queue, in a first queue among the plurality of queues, packets of the traffic associated with the IoT device, and deque, from the first queue, packets of the traffic associated with the IoT device, and to carry traffic for the IoT device in accordance with the second QoS further includes to:

queue, in a second queue among the plurality of queues, packets of the traffic associated with the IoT device, and deque, from the second queue, packets of the traffic associated with IoT device.

7. The system of claim 6, wherein the executable instructions further include instructions that, when executed by the processor, cause the processor to:

monitor a queue fill state, indicative of a fill state of the first queue, a fill state of the second queue, or both; and based at least in part on the queue fill state, indicated fill state, send a request for assignment of additional inroute capacity for carrying the traffic associated with the IoT device.

8. The system of claim 1, wherein the executable instructions further include instructions that, when executed by the processor, cause the processor to:

receive a baseline classifier model, store the baseline classifier model in a memory, and apply the stored baseline classifier model as the machine learning classifier.

9. The system of claim 8, wherein the executable instructions further include instructions that, when executed by the processor, cause the processor to:

generate a retrained baseline classifier model, based at least in part on applying a retraining to the stored baseline classifier;

upload the retrained baseline classifier model to a server; and subsequent to the upload, to:

receive an updated baseline classifier model, and set the stored baseline classifier model according to the received updated baseline classifier model.

10. A method for fingerprint based detection of an Internet of Things (IoT) device, classification of IoT device type, and corresponding allocation of link resources, comprising monitoring, in association with a link, a traffic of a device and generating a corresponding feature data;

classifying the device, based at least in part on applying a machine learning classifier to at least a portion of the feature data, between being and not being an IoT device of a particular IoT device type;

assigning an IoT device type-specific quality of service (QoS) for carrying a traffic associated with the IoT device of the particular IoT device type, and allocating, for traffic associated with the IoT device of the particular IoT device type, resources of the link in accordance with the assigned IoT device type-specific QoS;

wherein classifying the device between being and not being an IoT device of the particular IoT device type includes:

applying the feature data to a first classifier that is configured to classify the device between being an IoT device and being a non-IoT device and, applying, to a second classifier, an input that is based at least in part on the feature data of the IoT device of the particular IoT device type, the second classifier being configured to classify the IoT device between being and not being the particular IoT device type.

11. The method of claim 10, wherein the method further includes:

receiving a baseline classifier model, storing the baseline classifier model in a memory, and applying the stored baseline classifier model as the machine learning classifier.

12. The method of claim 11, wherein the method further includes:

generating a retrained baseline classifier model, based at least in part on applying a retraining of the stored baseline classifier;

uploading the retrained baseline classifier model to a server; and, subsequent to the upload, receiving an updated baseline classifier model, and setting the stored baseline classifier model according to the received updated baseline classifier model.

13. The method of claim 10, wherein:

the particular IoT device type is an IoT first device type, the QoS is a first QoS, the second classifier is further configured to classify the IoT device into one among a plurality of classes, the plurality of classes including an IoT first device type class, an IoT second device type class, and an IoT device null class that includes neither the IoT first device type nor the IoT second device type, and assigning a second QoS for carrying traffic associated with the IoT device of the particular IoT device type.

14. The method of claim 13, wherein the first QoS includes a guaranteed first bandwidth and the second QoS includes a guaranteed second bandwidth, the guaranteed second bandwidth being greater than a threshold, and the guaranteed first bandwidth being not greater than the threshold, and wherein method further includes:

selecting, as a modem, between a first modem and a second modem, the first modem having a first bandwidth and the second modem having a second bandwidth, the second bandwidth being greater than the first bandwidth, transmitting at least a portion of traffic flow through the selected modem, wherein the selecting is configured to select the first modem in association with the second classifier classifying the IoT device into the IoT first device type class, and select the second modem in association with the second classifier classifying the IoT device into the IoT second device type class.

15. The method of claim 13, wherein:

the first QoS includes a first maximum delay guarantee, the second QoS includes a second maximum delay guarantee, the second maximum delay guarantee being different than the first maximum delay guarantee, carrying traffic for the IoT device in accordance with the first QoS includes queuing, in a queue, packets of the traffic associated with the IoT device and dequeuing from the queue, according to a first priority, packets of the traffic associated with the IoT device, carrying traffic for the IoT device in accordance with the second QoS includes queuing, in the queue, packets of the traffic associated with the IoT device, and dequeuing from the queue, according to a second priority, packets of the traffic associated with the IoT device, and based at least in part on the first maximum delay guarantee being greater than the second maximum delay guarantee, the second priority is greater than the first priority.

16. The method of claim 15, wherein:

the queue includes a plurality of queues, carrying traffic for the IoT device in accordance with the first QoS further includes:

queuing, in a first queue among the plurality of queues, packets of the traffic associated with the IoT device, and dequeuing, from the first queue, packets of the traffic associated with the IoT device, and carrying traffic for the IoT device in accordance with the second QoS further includes:

queuing, in a second queue among the plurality of queues, packets of the traffic associated with the IoT device, and dequeuing, from the second queue, packets of the traffic associated with IoT device.

17. The method of claim 16, wherein the method further includes:

monitoring a queue fill state, indicative of a fill state of the first queue, a fill state of the second queue, or both; and based at least in part on the queue fill state, sending a request for assignment of additional inroute capacity for carrying the traffic associated with the IoT device.

18. The method of claim 10, wherein the method further includes at least partially training the machine learning classifier.

* * * * *